US011870672B2

(12) United States Patent
Olsen et al.

(10) Patent No.: US 11,870,672 B2
(45) Date of Patent: Jan. 9, 2024

(54) SELF-ELECTION PROCESSES IN MANAGED SUBNETS IMPLEMENTING MODIFIED SWIM PROTOCOLS

(71) Applicant: Ivanti, Inc., South Jordan, UT (US)

(72) Inventors: Gregory Paul Olsen, Lindon, UT (US); Rex Michael McMillan, South Jordan, UT (US); Blake Thompson, South Jordan, UT (US); Scot Emery Swan, Mapleton, UT (US)

(73) Assignee: Ivanti, Inc., South Jordan, UT (US)

( * ) Notice: Subject to any disclaimer, the term of this patent is extended or adjusted under 35 U.S.C. 154(b) by 54 days.

(21) Appl. No.: 17/231,698

(22) Filed: Apr. 15, 2021

(65) Prior Publication Data

US 2021/0328899 A1 Oct. 21, 2021

Related U.S. Application Data

(60) Provisional application No. 63/011,142, filed on Apr. 16, 2020.

(51) Int. Cl.
*H04L 43/106* (2022.01)
*H04L 43/06* (2022.01)
(Continued)

(52) U.S. Cl.
CPC ............ *H04L 43/106* (2013.01); *H04L 43/06* (2013.01); *H04L 61/103* (2013.01);
(Continued)

(58) Field of Classification Search
CPC ..... H04L 43/106; H04L 43/06; H04L 61/103; H04L 61/5069; H04L 43/08;
(Continued)

(56) References Cited

U.S. PATENT DOCUMENTS 9,203,865 B2 * 12/2015 Linden ................. G06F 11/181
10,116,526 B2 * 10/2018 Memmott .............. H04L 67/34
(Continued)

FOREIGN PATENT DOCUMENTS

CN 101366243 A * 2/2009 ........... H04L 12/413

OTHER PUBLICATIONS

Das, et al., SWIM: Scalable Weakly-consistent Infection-style Process Group Membership Protocol; Proceedings of the International Conference on Dependable Systems and Networks (DSN'02), http:/www.cs.cornell.edu.gupta/swim, 10 pages. (Year: 2002).*
(Continued)

*Primary Examiner* — Dhairya A Patel
*Assistant Examiner* — Alex H. Tran

(57) ABSTRACT

An embodiment includes a method of self-election of a node in a subnet. The method includes receiving a first ping message. The first ping message is unicast from a second node, includes direct information related to the second node, and includes indirect information related to a third node. The method includes updating a first status of the second node in a status list stored at the first node consistent with the direct information. The method includes determining whether statuses of a threshold number of nodes have been received. Responsive to the threshold number of nodes being received, the method includes performing a local election operation. The method includes propagating a second ping message to a randomly identified additional node. The second ping message includes direct information regarding the first node and indirect information regarding at least one other node.

20 Claims, 15 Drawing Sheets

(51) Int. Cl.
*H04L 61/103* (2022.01)
*H04L 61/5069* (2022.01)
*H04L 43/08* (2022.01)
*H04L 101/668* (2022.01)

(52) U.S. Cl.
CPC .......... *H04L 61/5069* (2022.05); *H04L 43/08* (2013.01); *H04L 2101/668* (2022.05)

(58) Field of Classification Search
CPC ......... H04L 2101/668; H04L 2101/622; H04L 12/1886; H04L 43/10; H04L 41/0213; H04L 41/042; H04L 43/0817; H04L 41/0893; H04L 41/0668; H04L 67/1051; H04L 67/1093; H04L 41/0663; H04L 41/0659
See application file for complete search history.

(56) References Cited

U.S. PATENT DOCUMENTS

| | | | | |
|---|---|---|---|---|
| 10,305,721 | B1* | 5/2019 | Binns | H04L 43/00 |
| 10,810,093 | B1* | 10/2020 | Tucek | H04L 41/30 |
| 2012/0185553 | A1* | 7/2012 | Nelson | H04L 67/10 709/209 |
| 2020/0389521 | A1* | 12/2020 | Brock | H04L 67/108 |
| 2022/0029883 | A1* | 1/2022 | Cai | H04L 41/0816 |

OTHER PUBLICATIONS

Das, et al., SWIM: Scalable Weakly-consistent Infection-style Process Group Membership Protocol; Proceedings of the International Conference on Dependable Systems and Networks (DSN'02), http://www.cs.cornell.edu.gupta/swim, 10 pages.

International Search Report and Written Opinion for International Application No. PCT/US2021/027686, dated Aug. 4, 2021, 13 pages.

International Search Report and Written Opinion for International Application No. PCT/US2021/027686, dated Oct. 13, 2022, 8 pages.

* cited by examiner

500A

Status List (First Service) *314*

| Node | *106* | Machine State *502* | Node Election State *504* | Election Score *506* | Received *508* | Ancillary *510* |
|---|---|---|---|---|---|---|
| First Node | *106A* | Active | Selected | 10 | X | X |
| Second Node | *106B* | Active | Passive | 2 | | |
| Third Node | *106C* | Active | Passive | 5 | | |
| Fourth Node | *106D* | Active | Passive | 6 | | |
| Fifth Node | *106E* | Active | Passive | 7 | | |
| Sixth Node | *106F* | Active | Passive | 4 | | |

Status List (First Service) *314*

| Node | *106* | Machine State *502* | Node Election State *504* | Election Score *506* | Received *508* | Ancillary *510* |
|---|---|---|---|---|---|---|
| First Node | *106A* | Active | Selected | 10 | X | X |
| Second Node | *106B* | Active | Passive | 2 | | |
| Third Node | *106C* | Active | Passive | 5 | | X |
| Fourth Node | *106D* | Active | Passive | 6 | X | |
| Fifth Node | *106E* | Active | Passive | 7 | | |
| Sixth Node | *106F* | Active | Passive | 4 | X | |

Status List (First Service) 314

| Node | 106 | Machine State 502 | Node Election State | Election Score 506 | Received 508 | Ancillary 510 |
|---|---|---|---|---|---|---|
| First Node | 106A | Active | Selected | 10 | X | X |
| Second Node | 106B | Active | Passive | 2 | | X |
| Third Node | 106C | Active | Passive | 5 | X | X |
| Fourth Node | 106D | Active | Passive | 6 | X | |
| Fifth Node | 106E | Active | Passive | 7 | X | |
| Sixth Node | 106F | Active | Passive | 4 | X | |

Status List (First Service) 314

| Node | 106 | Machine State 502 | Node Election State 504 | Election Score 506 | Received 508 | Ancillary 510 |
|---|---|---|---|---|---|---|
| First Node | 106A | Active | Selected | 10 | X | X |
| Second Node | 106B | Active | Passive | 2 | X | X |
| Third Node | 106C | Active | Passive | 5 | X | |
| Fourth Node | 106D | Active | Passive | 6 | X | X |
| Fifth Node | 106E | Active | Passive | 7 | X | |
| Sixth Node | 106F | Active | Passive | 4 | X | |

FIG. 5D

SELF-ELECTION PROCESSES IN MANAGED SUBNETS IMPLEMENTING MODIFIED SWIM PROTOCOLS

CROSS REFERENCE TO RELATED APPLICATION

This application claims the benefit of and priority to U.S. Provisional Appl. No. 63/011,142, filed Apr. 16, 2020, which is incorporated herein by reference in its entirety.

FIELD

The embodiments described in this disclosure are related to management of computer networks, and in particular to self-election processes in managed subnets implementing modified SWIM protocols.

BACKGROUND

In managed networks and segments of managed networks, which are sometimes referred to as subnets, computer services may be executed. For instance, the computer service may determine the status of computing devices in the managed subnet. The service might return whether each of the computing devices in the managed subnet is active or offline.

In some managed networks, one of the managed devices or endpoints is elected to execute one or more of the services. Instead of an administrative device executing the service, the elected managed device performs the operations involved in the service. The elected managed device may then communicate the results to the administrative device. Execution of the service by the elected managed device benefits the subnet, and reduces computing overhead associated with the service.

To elect the managed device, an election operation may be performed among the managed devices. Based on some criteria, one of the managed devices may be selected. Conventional election operations require communication of election information to each of the managed devices to ensure only one of the managed devices executes the service. Communication of the election information among the managed devices might affect bandwidth available in the managed subnet. For instance, some election processes use an address and port specified as multicast channel to communicate the election information among the managed devices. Communication of multicast packets to each of the managed devices regarding election information reduces the bandwidth available to the network. Accordingly, the communication of large quantities the election information in the subnet can be problematic. Thus, some subnet operators disable the multicast channels to avoid bandwidth reduction, which may affect proper operation of self-election processes.

Scalable Weakly-consistent Infection-style Process Group Membership (SWIM) protocol is a gossip-style communication protocol. The SWIM protocol is primarily used to determine which peers in a distributed system are active. The SWIM protocol communicates information in a particular way to enable multiple streams of information, both direct and indirect, to better determine status of peers. The SWIM protocol is generally limited to peer status identification. Moreover, some aspects (e.g., finding and joining operations) of the SWIM protocol implements multicast processes.

Thus, use of the SWIM protocol in self-election processes may therefore be problematic. In particular, direct implementation of the SWIM protocol may introduce the bandwidth reductions present in conventional self-election processes. Accordingly, there is a need in the field of managed networks for self-election processes in managed subnets implementing modified SWIM protocols.

The subject matter claimed herein is not limited to embodiments that solve any disadvantages or that operate only in environments such as those described. Rather, this background is only provided to illustrate one example technology area where some embodiments described herein may be practiced.

SUMMARY

An aspect of an embodiment includes a method of self-election of a node in a subnet. The method may include receiving a first ping message. The first ping message may be unicast from a second node and may include direct information related to the second node and indirect information related to a third node. The method may include updating a first status of the second node in a status list, which may be stored at the first node, consistent with the direct information. The method may include determining whether statuses of a threshold number of nodes have been received. Responsive to the threshold number of nodes being received, the method may include performing a local election operation. The method may include propagating a second ping message to a randomly identified additional node. The second ping message may include direct information regarding the first node and indirect information regarding at least one other node.

An aspect of an embodiment includes another method of self-election of a node in a subnet. The method may include receiving a first ping message. The first ping message may be received by a first node of multiple nodes in the subnet. The first ping message may be unicast from a second node of the multiple nodes in the subnet. The first ping message may include direct information related to the second node and indirect information related to a third node of the multiple nodes in the subnet. The direct and the indirect information may include election information which may include election state or election score of the nodes as well as a node number indicative of a number of nodes in the subnet. The method may include updating a first status of the second node in a status list consistent with the direct information. The status list may be stored at the first node. The method may include determining whether statuses of a threshold number of nodes of the plurality of nodes have been received. Responsive to the threshold number of nodes being received, the method may include performing a local election operation. The local election operation may include determining a current election score of the first node based on election rules associated with identifying a particular node from the plurality of nodes in the subnet to provide a service. The local election operation may include comparing the current election score to the determined election scores. Responsive to the current election score being greater than the determined election scores, the local election operation may include changing a current election state of the first node to a selected state for the service; communicating a response message to the second node, and executing, by the first node, the service in the subnet without oversight by an administration device. The response message may include the current election state of the first node and indirect information related to one or more nodes of the multiple nodes. The response message may be configured to indicate that the first node is an elected node for exclusive execution of the service in the subnet. The method may include propagating a second ping message to at least one randomly identified or selected additional node of the multiple nodes. The second ping message may include direct information regarding the first node and indirect information regarding at least one other node of the plurality of nodes.

Another aspect of an embodiment includes a non-transitory computer-readable medium having encoded therein programming code executable by one or more processors to perform or control performance of any combination of the operations of the methods of self-election of a node in a subnet described above. Yet another aspect of an embodiment includes a node of a subnet comprising one or more processors and a non-transitory computer-readable medium having encoded therein programming code executable by one or more processors to perform or control performance of any combination of the operations of the methods of self-election of a node in a subnet described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 5A-5D depict an example simplified status list that coincides with the communication process of FIG. 4;

DESCRIPTION OF SOME EXAMPLE EMBODIMENTS

Figure 1:
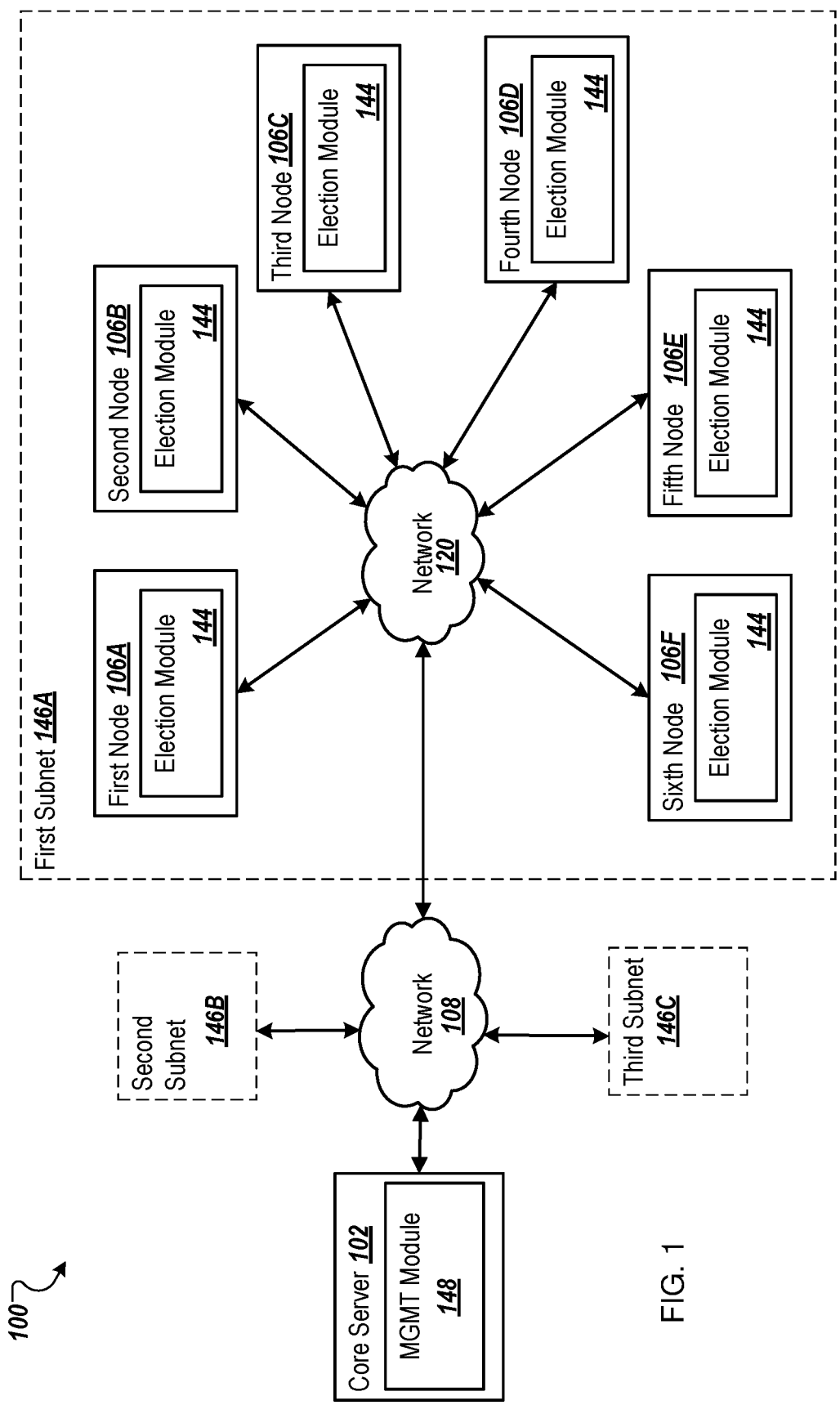
FIG. 1 depicts a block diagram of a first example operating environment.

Embodiments of the present disclosure relate to management of computer networks, and in particular to self-election processes in managed subnets implementing modified SWIM protocols. Some embodiments enable implementation of self-election processes in subnets in which multicast channels have been disabled or restricted. The self-election processes may enable election of a node in the managed subnet. The elected node may then execute a service among other nodes in the managed subnet. For instance, an example service may determine the status of nodes in the managed subnet. The service might return whether each of the nodes in the managed subnet is active or offline. The elected node may implement the service and communicate the results to an administrative device.

Some embodiments described herein implement a modified version of a Scalable Weakly-consistent Infection-style Process Group Membership (SWIM) protocol. The modified SWIM protocol enables communication of election information among the nodes without using or with minimal use of multicast communications.

Some embodiments described herein improve conventional network management systems. For instance, some embodiments enable node self-election without using multicast communications, which decrease congestion on multicast channels. Moreover, many subnets have disabled multicast communications, which in turn prohibit proper operation of conventional self-election processes.

In particular, example embodiment includes a method of self-election of a node in a subnet. The method may include receiving a first ping message at a first node. The first ping message may be received from a second node in the subnet. The first ping message may include direct information related to the second node and indirect information related to another node in the subnet. The direct and the indirect information may include election information which may include election state or election score of the nodes as well as a node number indicative of a number of nodes in the subnet. The first node may update a status list with the direct and indirect information. The first node may wait until it receives election information regarding a threshold number (e.g., 80%) of nodes in the network. After the first node receives election information regarding the threshold number of nodes, the first node may perform a local election operation.

The local election operation may include determining an election score for the first node. Based on a comparison between the election score of the first node and determined election scores for other nodes, the first node may determine whether it is elected to execute the service in the subnet. The first node may update its election state in the status list and communicate a second ping message to another node in the subnet. The second ping message includes direct information and indirect information. The direct information pertains to the first node. The indirect information pertains to one or more other nodes in the subnet. The direct and the indirect information may include election information which may include election state or election score of the nodes as well as a node number indicative of a number of nodes in the subnet. The second ping message disseminates information that the first node is elected to execute the service. The first node may also notify and administrative device, which may enable coordination between the first node and the administrative device for execution of the service. Accordingly, this and other embodiments of the present disclosure describe a self-election process that does not rely on multicast information and utilizes localized election operations.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

FIG. 1 is a block diagram of a first example operating environment 100 in which some embodiments of the present invention can be implemented. In the first operating environment 100, nodes 106A-106F (generally, node 106 or nodes 106) are configured to perform a self-election process. The self-election process results in selection of one of the nodes 106 to execute a service in a subnet 146A-146C (generally, subnet 146 or subnets 146). In addition, the nodes 106 of the subnets 146 are configured to exchange and distribute election information within the subnet 146 using a modified SWIM protocol. Distribution of the election information in this manner enables the nodes 106 to locally perform election processes and to efficiently distribute results of the election process as well as additional information regarding the nodes 106 without relying on multicast or broadcast communications.

Conventional self-election processes may rely on multicast communications to distribute election information. For instance, a conventional self-election process is described in U.S. Pat. No. 10,116,526, which is incorporated herein by reference in its entirety. In the process described, after an election score is determined, it is multicast to remaining managed devices. The remaining managed devices use the multicast communication to assess its status regarding an elected managed device. However, in some managed networks, multicast communication capabilities are disabled. Accordingly, the nodes in these managed networks are unable to effectively perform the self-election process. A result is that multiple managed devices determine they are alone in a network segment, and thus elect itself to provide a service. The multiple managed devices concurrently provide the service and communicate with the administrative devices, further resulting in potentially inaccurate service results and inefficient use of computing resources due to repeated services.

Embodiments describe in the present invention improve this conventional self-election processes. For instance, the self-election process in some embodiments do not rely on multicast communication. Instead, these and other embodiments implement a modified SWIM protocol to disseminate election information in the subnet 146. Communication of election information using the modified SWIM protocol efficiently disseminates the election information while reducing bandwidth issues associated with multicast communications. The embodiments described in the present disclosure are thus usable in subnets in which multicast capabilities are disabled. Moreover, in some embodiments, the dissemination of information using the modified SWIM protocol may be conducted in an ongoing process. Accordingly, status changes of the nodes 106 can be quickly (e.g., within a few minutes) communicated to all or substantially all of the nodes 106 in the subnet 146. The nodes 106 may implement the self-election process locally based on disseminated information and act on the result of the local election process instead of waiting for multicast confirmation of a particular status.

Embodiments of the present disclosure are directed to a computer-centric problem and are implemented in a computer-centric environment. For instance, the embodiments of the present disclosure are directed to management networks or network segments and computing processes occurring on the nodes 106 included in such network segments.

The election operations, information dissemination, and subnet services executed on the nodes 106 may represent edge operations. The edge operations may provide improved latency and improved data aggregation because the data and processing are occurring close to sources of the data. Thus, the operations provided by the nodes 106 may improve on conventional cloud-based networks with centralized processing.

The first operating environment 100 of FIG. 1 is configured as a cloud-based network in which a core server 102 is communicatively coupled to multiple subnets 146 via a first network 108. The subnets 146 may include multiple nodes 106. For instance, FIG. 1 depicts a first subnet 146A that includes the nodes 106A-106F. The nodes 106A-106F may be communicatively coupled via a second network 120. Each of the components (102, 146, 108, 106, and 120) are described in the following paragraphs.

One or both of the first network 108 and the second network 120 (collectively, networks 108/120) may include any communication network configured for communication of signals between the components (e.g., 102, 106, and 146) of the operating environment 100. The networks 108/120 may be wired or wireless. The networks 108/120 may have configurations including a star configuration, a token ring configuration, or another suitable configuration. Furthermore, the networks 108/120 may include a local area network (LAN), a wide area network (WAN) (e.g., the Internet), and/or other interconnected data paths across which multiple devices may communicate. In some embodiments, the networks 108/120 may include a peer-to-peer network. The networks 108/120 may also be coupled to or include portions of a telecommunications network that may enable communication of data in a variety of different communication protocols.

In some embodiments, the networks 108/120 includes or is configured to include a BLUETOOTH® communication network, a Z-Wave® communication network, an Insteon® communication network, an EnOcean® communication network, a Wi-Fi communication network, a ZigBee communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 108/120 may include data communicated via short messaging service (SMS), multimedia messaging service (MMS), hypertext transfer protocol (HTTP), direct data connection, wireless application protocol (WAP), or any other protocol that may be implemented with the nodes 106 and the core server 102.

The first network 108 and the second network 120 may differ in some embodiments. For instance, the second network 120 may include an intranet or a secured LAN. The second network 120 may be an intranet dedicated to an enterprise or set of users in these embodiments. For instance, the second network 120 may be separated from the first network 108 by a suitable network security or network isolation mechanism such as a firewall. In these and other embodiments, the first network 108 may at least partially be a public or multi-enterprise network such as the internet.

In some embodiments, the first network 108 and the second network 120 may be substantially integrated or may include a single network. For example, physical devices (e.g., network infrastructure) may be shared between the first network 108 and the second network 120. Additionally, in some embodiments, communications between the core server 102 and the nodes 106 may be via the networks 108/120 without further processing.

The embodiment of FIG. 1 includes three subnets 146A-146C. A first subnet 146A is representative of a second subnet 146B and a third subnet 146C. For instance, each of the subnets 146 may include multiple nodes 106 communicatively coupled by an instance of the second network 120. The subnets 146 may be managed groups of nodes 106. Management of the nodes 106 may include provision by a third party of computing services such as IT support, endpoint management, application management, and the like. The core server 102 may at least partially provide such services or oversee provision of these services. The self-election processes described in the present disclosure may be one element or service included in a computing service package.

The subnets 146 may be associated with an enterprise, a portion of an enterprise, a government entity, or another entity or group of nodes 106. Within the subnets 146, services may be implemented independently or substantially independently (e.g., using primarily local computing resources) by one of the nodes 106. The node 106 that executes the service in the subnet 146 is elected by the self-election process described herein.

The services executed in the subnets 146 may include any suitable service implemented among a group of the nodes 106. Some examples of the service may include pre-boot services (e.g., preboot execution environment (PXE) services), device discovery services and media streaming services (e.g., universal plug and play (UPnP)). The service may also be a Windows service, Linux/Unix daemon, or another standard process.

The core server 102 may include a hardware-based computing system. The core server 102 may be communicatively coupled to the subnets 146 and the nodes 106 therein by the networks 108/120.

The core server 102 may include a management module 148 (in the figures "MGMT module 148"). The management module 148 is configured to provide computing services to the subnets 146, which may include node management (e.g., endpoint management, application management, IT support, and the like). The management module 148 may be further configured to oversee execution of services in the subnets 146 performed by the nodes 106. For instance, the management module 148 may track which of the nodes 106 is selected to execute a service. The management module 148 may also receive results and products of the services such that these results and products may be analyzed.

Additionally, the management module 148 may be configured to initiate the services. For instance, the management module 148 may communicate with an elected node 106 to initiate a service. Following execution of the service, the elected node 106 may communicate the result or the product of the service to the management module 148. A benefit of the self-election process may be a reduction in communication between the nodes 106 and the core server 102. In particular, instead of performing the service by the core server 102, which may include multiple communications to each of the nodes 106, the service is executed by the elected node 106 without communications with any other of the nodes 106. Execution of the service by the node 106 improves efficiency by moving the processing to the subnets 146 and reduces communication between the core server 102 and the nodes 106.

In some embodiments, the core server 102 may be one server or a virtual server in a cloud-base network of servers. In these and other embodiments, the management module 148 may be spread over two or more cores, which may be virtualized across multiple physical machines.

The nodes 106 may include a hardware-based computing devices. The nodes 106 are configured to communicate with and receive instruction from the core server 102. The nodes 106 may be further configured to communicate data and information with the other nodes 106 in the subnet 146A. For example, the nodes 106 may communicate with the core server 102 over an intranet or an extranet via the transmission control protocol/internet protocol (TCP/IP). The nodes 106 may include endpoints in the subnet 146A. Examples of the nodes 106 include desktop computers, laptop computers, tablet computers, servers, cellular phones, smartphones, routers, gaming systems, etc.

The nodes 106 include an election module 144. The election module 144 is configured to perform self-election processes and election information communication using a modified SWIM protocol, which are described elsewhere in the present disclosure. In some embodiments, the nodes 106 may include a local agent that in implements administrative and/or management processes within the subnet 146. The agent may also communicate with the core server 102.

The election module 144, the management module 148, and components thereof may be implemented using hardware including a processor, a microprocessor (e.g., to perform or control performance of one or more operations), a field-programmable gate array (FPGA), or an application-specific integrated circuit (ASIC). In some other instances, election module 144, the management module 148 and components thereof may be implemented using a combination of hardware and software. Implementation in software may include rapid activation and deactivation of one or more transistors or transistor elements such as may be included in hardware of a computing system (e.g., the nodes 106, the core server 102, or host device 202 of FIG. 2). Additionally, software defined instructions may operate on information within transistor elements. Implementation of software instructions may at least temporarily reconfigure electronic pathways and transform computing hardware.

Modifications, additions, or omissions may be made to the first operating environment 100 without departing from the scope of the present disclosure. For example, the first operating environment 100 may include one or more core servers 102, one or more nodes 106, one or more subnets 146, or any combination thereof. Moreover, the separation of various components and devices in the embodiments described herein is not meant to indicate that the separation occurs in all embodiments. Moreover, it may be understood with the benefit of this disclosure that the described components and servers may generally be integrated together in a single component or server or separated into multiple components or servers.

Figure 2:
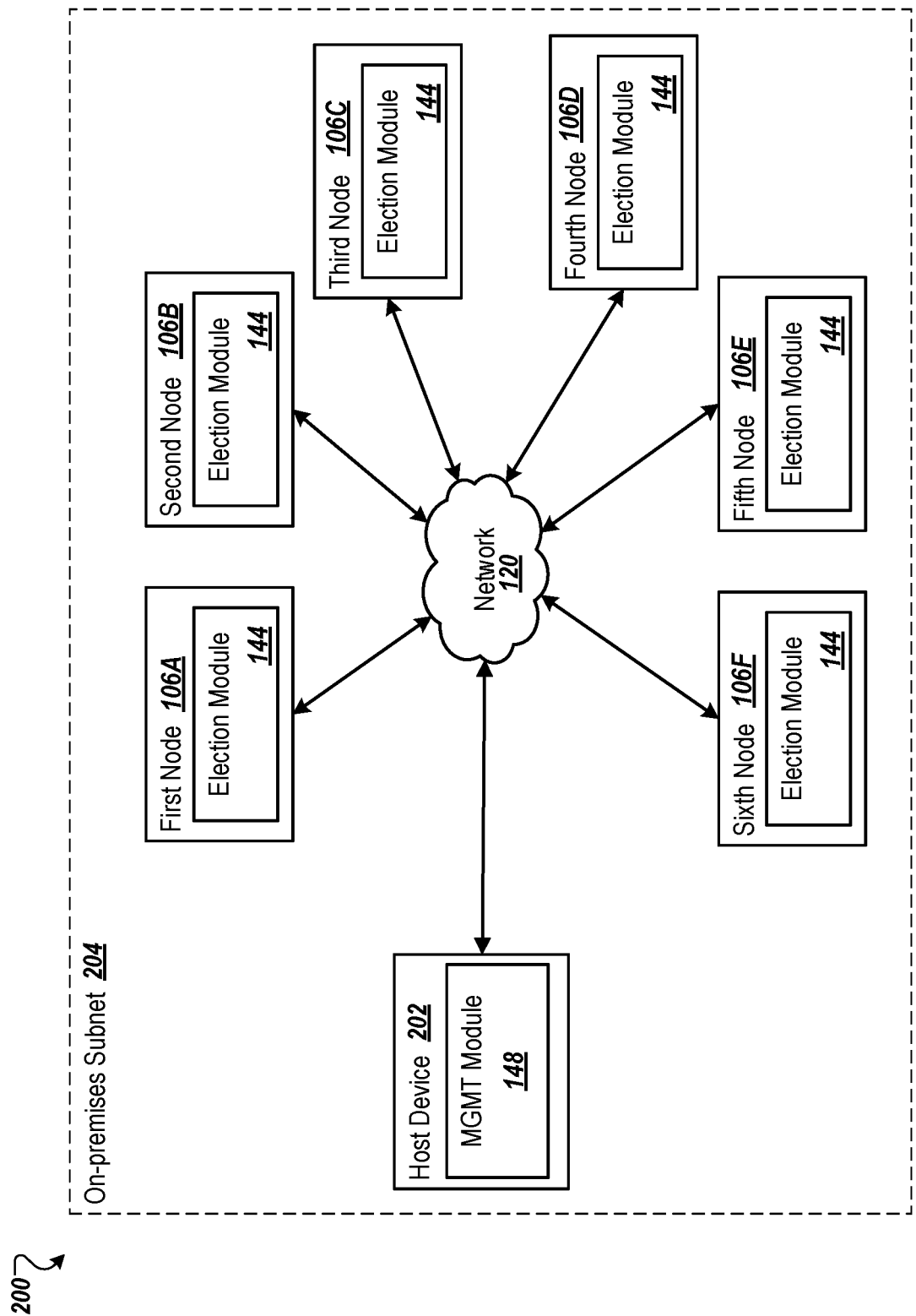
FIG. 2 depicts a block diagram of a second example operating environment.

FIG. 2 is a block diagram of a second example operating environment 200 in which some embodiments of the present invention can be implemented. The second operating environment 200 is substantially similar to the first operating environment 100. The second operating environment 200 is an on-premises version of the first operating environment 100. Like the first operating environment 100, the second operating environment 200 includes the nodes 106 that are communicatively coupled via the second network 120, the election module 144, and the management module 148, which are implemented for a self-election process and dissemination of election information via a modified SWIM protocol.

In addition to these components, the second operating environment 200 may include a host device 202 and an on-premises subnet 204. The on-premises subnet 204 may be substantially similar to the subnets 146. However, the on-premises subnet 204 may not be communicatively coupled to the core server 102. Instead, in the on-premises subnet 204, the election module 144 and the management module 148 may be installed and run within the on-premises subnet 204 without or with minimal instruction from an external component.

The host device 202 may include a hardware-based computing system. The host device 202 may be communicatively coupled to the nodes 106 via the second network 120. The host device 202 may be configured to perform similar functions to those of the core server 102 of FIG. 1. For example, the host device 202 may be configured to oversee management of the nodes 106. The host device 202 may initiate one or more services on the nodes 106. Additionally, the host device 202 may receive and enable analysis of results and products of the services.

The host device 202 may be a part of the on-premises subnet 204. A network location of the host device 202 differs from a network address of the core server 102 of FIG. 1, which is remote from the subnets 146. The on-premises subnet 204 may be operated independently of a larger network. For instance, the on-premises subnet 204 may be an enterprise subnet or government subnet. The host device 202 may include or have loaded thereon the management module 148. As described above, the management module 148 may implement one or more computing services. In the on-premises implementation, the computing services may be locally provided (e.g., in the on-premises subnet 204).

The election module 144 in one or both of the operating environments 100 and 200 may be configured for self-election of one of the nodes 106 in the subnets 146 or 204. The election process implemented by the election module 144 may enable selection of one of the nodes 106 to execute services in the subnet 146. Additionally, the election module 144 may be configured to disseminate election information using a modified SWIM protocol. The communication of the election information may include ping messages and response messages communicated between the nodes 106. The ping and response messages include direct information regarding the node 106 that is sending the ping or response message as well as indirect information regarding at least one other node 106 of the subnet 146A/204.

For example, the election module 144 of a first node 106A may perform a subnet initialization operation. The subnet initialization operation may include communication of one or more messages to detect the nodes 106 in a subnet when a new node is introduced or reactivated in the subnet 146A/204. The subnet initialization operation may include communication of a multicast or a broadcast message, which may be communicated in the subnet 146A/204. One or more nodes 106 that receive the multicast or the broadcast message, may add a new node to a status list and prioritize a ping message response to the multicast or the broadcast message. Additionally or alternatively, the nodes 106 or the new node may be configured to monitor for and detect an address resolution protocol (ARP) message in the subnet 146A/204. ARP messages detected on unknown IP addresses may be added to the status list and ping message response may be communicated to the IP address. The subnet initialization operation may be configured to determine whether there are nodes 106 or new nodes in a subnet 146A/204 and to begin interface with between the nodes 106 and a new node.

In the election process, the election module 144 may receive a first ping message. The first ping message may be unicast or directly communicated from a second node 106B in the subnet 146A/204. The first ping message may include direct information related to the second node 106B (i.e., the transmitting node) and indirect information related to a third node 106C in the subnet 146A/204 (i.e., another node not transmitting the messages). The direct information may include a first election state and a first machine state of the second node 106B. The indirect information may similarly include a second election state and a second machine state of the third node 106C. The direct and the indirect information may include election information which may include election state or election score of the nodes 106 as well as a node number. The node number may be indicative of a number of nodes 106 the transmitting node (e.g., the second node 106B) has identified in the subnet 146A/204. In some embodiments, the direct information may be weighted and addressed differently than the indirect information.

The election module 144 may update a first status of the second node 106B in a status list, which may be stored at the first node 106A. The first status is updated consistent with the direct information in the first ping message. The election module 144 may conditionally update a second status of the third node 106C based on the indirect information of the first ping message. For instance, based on a date of the indirect information, the election module 144 may update or not update the status of the third node 106C.

Following the update to the status list, the election module 144 may determine whether statuses of a threshold number of nodes 106 have been received. For instance, the subnet 146A/204 includes six nodes total and five nodes 106 other than the first node 106. The threshold number may be 80%. Thus, once the status of four of the nodes 106 is received (i.e., 80% of the nodes 106), the first node 106A may determine that the threshold number of nodes 106 have been received.

In some embodiments, the first ping message is one of multiple ping messages received by the first node. Each ping message of the multiple ping messages includes the node number. In these and other embodiments, the determining whether statuses of the threshold number of nodes are update may include averaging the number of nodes reported in the node numbers of the multiple ping messages and applying the threshold number against the average number of nodes.

If the threshold number of nodes 106 have not been received, then the election module 144 continues to receive ping messages until the threshold number of nodes 106 have been received. If the threshold number of nodes 106 have been received, the election module 144 locally performs an election operation.

The local election operation may be performed by the first node 106A. The election operation may include determination of election scores using the information in the status lists and election rules. Some examples of the election rules are provided in U.S. Pat. No. 10,116,526. The election scores of the first node 106A is compared to election scores determined for other nodes 106. Responsive to the election score of the first node 106A being the greatest, the first node 106A may be selected to execute a particular service in the subnet 146A/204. In these circumstance, the first node 106A may change its election state and propagate election information throughout the subnet 146A/204 using a modified SWIM protocol. For example, the first node 106A may communicate a response message to the first ping message and communicate a second ping message to another node 106. Some details of the dissemination of the election information are described elsewhere in the present disclosure.

The election module 144 may be configured to communicate a notification signal to the core server 102 or the host device 202. The notification signal is configured to indicate to the core server 102 or the host device 202 that the first node 106A is elected for exclusive execution of the service in the subnet 146A/204. The first node 106A or the election module 144 may be configured to execute the service in the subnet 146A/204 without oversight by the core server 102 or the host device 202. After execution of the service in the subnet 146A/204, the election module 144 may communicate a product or a result of the service to the core server 102 or the host device 202 without additional communication between the core server 102 or the host device 202 and remaining nodes 106 of the subnet 146A/204.

Modifications, additions, or omissions may be made to the second operating environment 200 without departing from the scope of the present disclosure. For example, the second operating environment 200 may include one or more host devices 202, one or more nodes 106, one or more on-premises subnets 204, or any combination thereof. Moreover, the separation of various components and devices in the embodiments described herein is not meant to indicate that the separation occurs in all embodiments. Moreover, it may be understood with the benefit of this disclosure that the described components and servers may generally be integrated together in a single component or server or separated into multiple components or servers.

Figure 3:
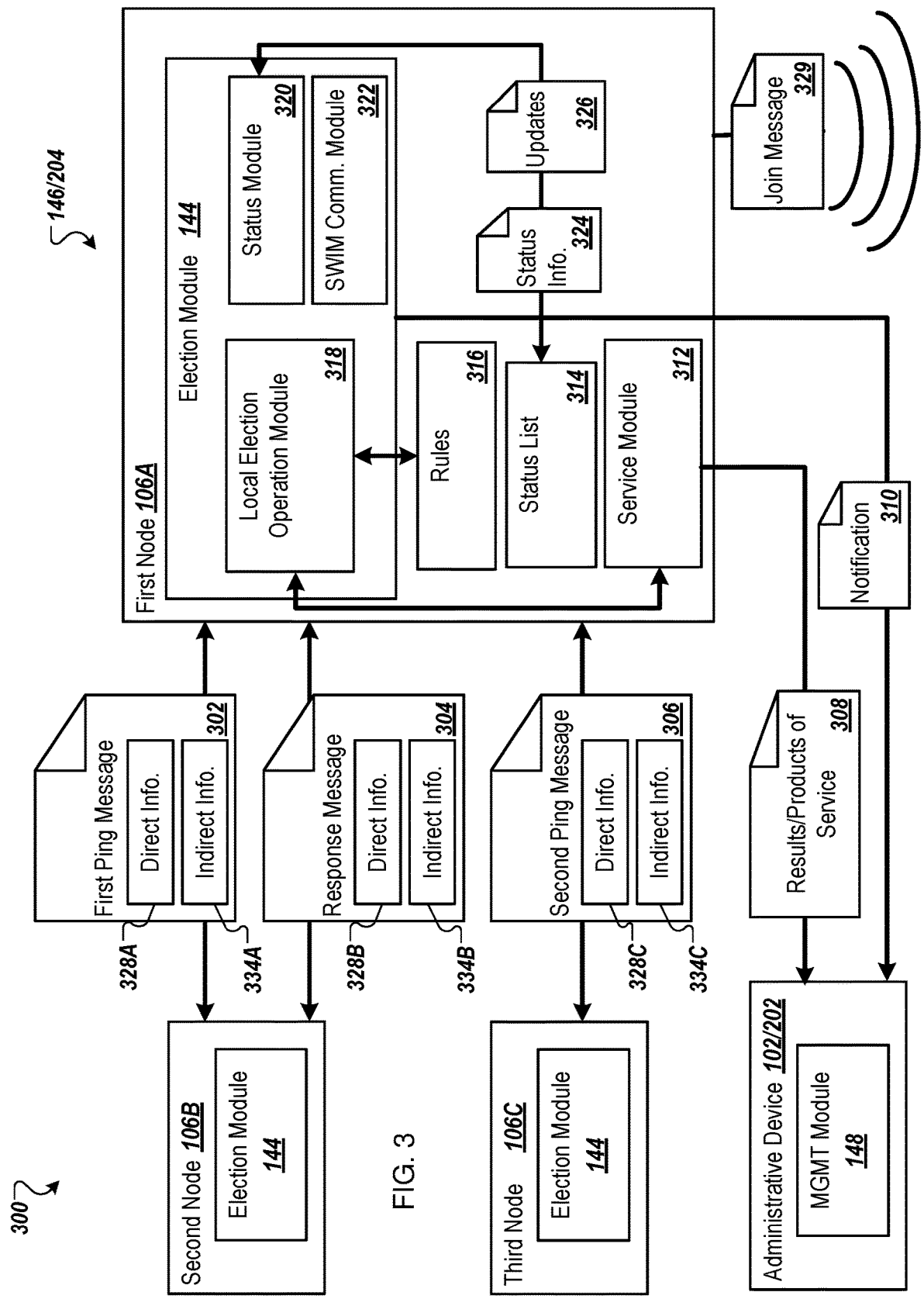
FIG. 3 is a block diagram of an example self-election process that may be implemented in the first or second operating environments of FIGS. 1 and 2.

FIG. 3 is a block diagram of an example self-election process 300. The self-election process may be implemented in the operating environments 100 or 200 or another suitable operating environment. The self-election process 300 may include the first node 106A; the second node 106B; a subnet, which corresponds to the first subnet 146A or the on-premises subnet 204; the third node 106C; and an administrative device, which corresponds to the host device 202 or the core server 102 described above. Some components (e.g., nodes 106D-106F, and networks 108 and 120) are omitted for FIG. 3. It may be understood with the benefit of the present disclosure, that communications between the depicted components (106A, 106B, and 102/202) may be via a communication network such as the networks 108 or 120. Additionally, while FIG. 3 depicts the first node 106A, the second node 106B, and the third node 106C, it may be understood that the self-election process 300 may be performed by and/or involve any combination of nodes 106 in the subnet 146A/204.

In the self-election process 300, the second node 106B may communicate a first ping message 302 to the first node 106A. The first ping message 302 may be unicast or directly communicated from the second node 106B to the first node 106A. The first ping message 302 may include direct information 328A and indirect information 334A. The direct information 328A may be information related to the second node 106 that communicates the first ping message 302. The information might include data indicative of a machine state of the second node 106B, an election state of the second node 106B, other information such as time, network location, device information, device capability, other information, or combinations thereof.

The indirect information 334A may be information related to one or more other nodes 106 in the subnet 146A/204. For instance, the first ping message 302 may include indirect information related to two or more (e.g., two, three, four, . . . ten) nodes 106. The indirect information 334A may be pulled from a status list (e.g., 314) of the second node 106B. For instance, the indirect information 334A may have been received at the second node 106B in another, earlier ping message. The indirect information 334A may include a machine state of the other node(s) 106, an election state of the other node(s) 106, other information such as time, network location, device information, device capability, other information, or combinations thereof.

In some embodiments, the first ping message 302 and one or more other messages (e.g., 304, 306, 308, 310, or some combination thereof) communicated in the subnet may be formatted using a user datagram protocol (UDP), for instance. In other embodiments, one or more of the messages may be communicated among the nodes and administrative devices using another protocol as will be understood by one with skill in the art.

The first ping message 302 may be received by the first node 106A. The first node 106A may weigh the direct information or the indirect information differently. In general, the direct information may be seen as more reliable than indirect information. Accordingly, the first node 106A may replace corresponding status information in the status list 314 with the direct information 328A regarding the second node 106B. The first node 106A may however, be configured to review one or more aspects of the indirect information 334A to ensure the indirect information 334A is reliable (e.g., the most recent information regarding the nodes 106 it describes).

The election module 144 may include a status module 320. The status module 320 may be configured to update and review information in the status list 314, which is stored on the first node 106A. The status module 320 may communicate updates 326 to the status list 314 based on the direct and indirect information 328A and 334A, for example. In addition, the status module 320 may pull or access status information 324 from the status list 314. The status module 320 may accordingly review the status information 324.

For instance, the status module 320 may update a first status related to the second node 106B with the direct information 328A. The direct information 328A may include a machine state and an election state of the second node 106B, which may be communicated to the status list 314. In particular, the direct information may indicate that the second node 106B is selected to execute a service in the subnet 146A/204. The first node 106A may update or change the status of the second node 106B in the status list 314 to reflect its status as "Selected" for a particular service. The first node 106A may then allow and cooperate with the second node 106B such that the service can be executed in the subnet 146A.

Regarding the indirect information 334A, a second status may be conditionally updated. For example, the indirect information 334A may be related to the third node 106C. The status module 320 may review a time associated with the indirect information 334A to determine whether the information in the status list 314 or the indirect information 334A is the most recent. Responsive to the indirect information 334A being outdated (e.g., more recent information is in the status list 314), the first node 106A may communicate the up-to-date information related to the third node 106C to the second node 106B.

For example, the first node 106A may determine of whether the indirect information is older than a current status for the third node 106C is based on an evaluation of a timestamp of the indirect information relative to an existing timestamp of a status entry for the third node 106C. Responsive to the timestamp of the indirect information being greater than the existing timestamp of the status entry for the third node 106C by a particular value, the indirect information may be accepted and the first node 106A may overwrite the status entry with the indirect information. Responsive to the timestamp of the indirect information being less than the existing timestamp of the status entry for the third node 106C. The first node 106C may not overwrite the status entry with the indirect information and may communicate a priority ping message to the second node 106B during an immediately subsequent swim period. The priority ping message may include information of the status entry related to the third node 106C. The second node 106B may then update its status list and begin to communicate more current information regarding the third node 106C. The particular value may be related to ways in which the timestamp is determined. For instance, in some embodiments the particular value may be equal to two. Thus, the timestamps must differ by at least two before one set of information is deemed outdated. Inclusion of the particular value may mitigate time zones or inaccuracies in clock settings between the nodes 106, for instance.

Additionally or alternatively, if the third node 106C is identified as inactive in the status list 314, the status module 320 may not update the status related to the third node 106C without taking additional actions.

The election module 144 may also include a local election operation module (operation module) 318. The operation module 318 may be configured to execute a local election operation at the first node 106A. Prior to initiating the local election operation, the operation module 318 may determine whether statuses of a threshold number of nodes 106 in the subnet 146A/204 are received in the status list 314.

In some embodiments, the first ping message is one of multiple ping messages received by the first node. Each ping message of the multiple ping messages includes a node number. The node number may indicate a number of nodes the transmitting node has identified in the subnet. In these and other embodiments, the determining whether statuses of the threshold number of nodes are update includes averaging the number of nodes reported in the node numbers of the multiple ping messages and applying the threshold number against the average number of nodes.

The threshold number may be 80%, 85%, 90%, 95% etc. of the total number of nodes 106 in the subnet 146A/204 other than the node 106 performing the process. For instance, the subnet 146A/204 might include forty-one nodes 106 and the threshold may be set to 80%. Accordingly, in this example, when the status list 314 includes election statuses of thirty-two of the nodes 106, the threshold number of nodes 106 may be met. The operation module 318 may communicate and interface with the status module 320 to evaluate the status list 314. The status module 320 may determine whether statuses of the nodes 106 have been received in the past set of SWIM periods (e.g., a particular number such as five, ten, fifteen SWIM periods), within the past time period (e.g., within the past day, within the past forty-eight hours), within a time between specific subnet updates, other suitable times, or combinations thereof.

In response to the threshold number of nodes 106 not being received, the first node 106A may simply wait until the threshold is met. For example, the first ping message 302 may include information related to three of the nodes 106. If, following receipt of the first ping message 302, the status module 320 determines that the threshold is not met, then the operation module 318 may wait to conduct the local election operation until additional ping messages are received.

Responsive to the threshold number of nodes 106 being received, the operation module 318 may perform the local election operation. In general, the local election operating may include application of one or more election rules 316 to information stored in the status list 314. In some embodiments, the election operation may be performed entirely or substantially entirely at the first node 106A using information in the status list 314 and the rules 316. The local election operation may determine which of the node 106 of the subnet 146A/204 is selected to execute a service on the subnet 146A/204.

The operation module 318 may determine a current election score for the first node 106A. The current election score may be determined based on election rules 316 that are associated with identifying a particular node from the nodes 106 in the subnet 146A/204 to provide a service. The election score indicates how good of a candidate a given node 106 is for providing a service. The election rules 316 may relate to criteria associated with the nodes 106, which may be weighted and/or combined to determine the election score. For instance, the election rules 316 may relate to a device type (e.g., desktop vs laptop), processor speed, available hard disk space, whether a node 106 is already running the service, information such as network location, device number, network address, processing capabilities, combinations thereof, and other computing criteria. The election rules 316 may be updated so that criteria can be added, modified, or removed.

The operation module 318 may compare a current election score for the first node 106A to determined election scores for the other nodes 106. The determined election scores may be pulled from the status list 314 and may have been previously communicated to the first node 106A. The operation module 318 may determine whether the current election score for the first node 106A is greater than the determined election scores for the other nodes 106.

In responsive to the current election score of the first node 106A being greater than the determined election scores for the other nodes 106, a current election state of the first node 106A may be changed. The current election state of the first node 106A may be changed to a "selected" state for the service. The selected state indicates that the first node 106A will exclusively execute the service in the subnet 146A/204 until the information in the status list 314 changes in a way that another node 106 is elected to execute the service. In some embodiments, when the current election state is changed, a new time stamp may be created for the first node 106A, which is appended to information responsive of the current election state.

In some circumstances, there may be tie between election scores of nodes 106. In these circumstance, the first node 106A may execute a tie-breaker algorithm to determine which of the nodes 106 will be selected to execute the service. For instance, the first node 106A may compare Global Unique ID (GUID) of nodes 106 with identical or nearly identical election scores. Whichever nodes 106 has the highest GUID or lowest GUID will be selected as the node 106 that performs the service in the subnet 146A/204. Some additional details of a suitable tie-breaking algorithm can be found in U.S. Pat. No. 10,116,526. In other embodiments, other tie-breaking algorithms may be used.

In some circumstances, the election score of the first node 106A may be less than one of the determined election scores for the other nodes 106. For instance, the operation module 318 may be determine an election score for the third node 106C, which is greater than election score determined for the first node 106A. Again, the operation module 318 may determine the election score locally based on information in the status list 314.

In some embodiments, the first ping message may include a flag that it indicates that the second node is elected the to execute the service. The flag may add a predefined buffer (e.g., 3 points, 5 points, or another suitable buffer) to its determined election score. The current election score of the first node may only be determined to be greater than the determined election score of the second node when the current election score is greater than a sum of the determined election score for the second node and the predefined buffer.

The operation module 318 may communicate an indication of which of the nodes 106 has the highest election score to the stats module 320. The node 106 with the highest election score may be flagged, which may add a buffer to a determined election score. The status module 320 updates an election state of the nodes 106 in the status list 314 to reflect this determination. Additionally, the first node 106A may allow and cooperate with the node 106 having the highest election score to execute the service in the subnet 146A/204.

The election module 144 may include a SWIM communication module 322. The SWIM communication module 322 may be configured to communicate messages in the subnet 146A/204. The SWIM communication module 322 may utilize a communication protocol that is similar to the SWIM protocol or a gossip protocol.

The SWIM communication module 322 may generate and communicate a response message 304. The response message 304 may be sent to the second node 106B responsive to the first ping message 302. In some embodiments, the response message 304 may include direct information 328B and indirect information 334B. The direct information 328B may include the current election state of the first node 106A as well as other information such as machine state, a timestamp, an election score, and device information related to the first node 106A. The indirect information 334B of the response message 304 may be related to one or more nodes 106 (e.g., the third node 106C) of the subnet 146A/204. Which nodes 106 are described in the indirect information 334C may be randomly identified. The response message 304 may be configured to indicate that the first node 106A is an elected node for exclusive execution of the service in the subnet 146A/204. Upon receipt of the response message 304, the second node 106B may update its status list and allow the first node 106A to execute the service in the subnet 146A/204.

The SWIM communication module 322 may also be configured to propagate a second ping message 306. The second ping message 306 may be substantially similar to the first ping message 302 except it is generated at and communicated from the first node 106A. For instance, the second ping message may include direct information 328C related to the first node 106A (e.g., the current election state) and indirect information 334C, which may include information related to other nodes 106 of the subnet 146A/204. In some embodiments, the second ping message 306 may be propagated to at least one randomly identified additional node of the subnet 146A/204. For instance, in FIG. 3, the third node 106C may be randomly identified from nodes in the subnet 146A/204 to receive the second ping message 306. Additionally, which nodes 106 are described in the indirect information 334C may be randomly identified.

One or more aspects of the propagation by the SWIM communication module 322 may be modified or updated. The aspect of the propagation may be modified to achieve some benefit to the subnet 146A/204. For instance, propagation of multiple ping messages (302 or 306) may increase a rate of dissemination of information (e.g., 328A, 328B, 334A, or 334B) in the status list 314 through the subnet 146A/204. Some example aspects that may be modified may include which node(s) 106 of the subnet 146A/204 are chosen to receive a ping message (302/306), a number of ping messages (302/306) communicated, contents of the ping messages (302/306), or some combination thereof. One or more of these aspects may be modified based on information in the first ping message 302 or second ping message 306, information in the status list 314, comparisons therebetween, similar information and comparisons, or combinations thereof. Some additional details of modifications to the propagation of information in the subnet are described elsewhere in the present disclosure.

In some embodiments, the election module 144 may be configured to generate and communicate a join message 329. The join message 329 may be configured to enable engagement or re-engagement of nodes 106. For instance, the join message 329 may include information used by a receiving node 106 to generate a ping message. The ping message may be communicated to the first node 106A.

In some embodiments, the join message 329 may be broadcast into the subnet 146A/204. Accordingly, the join message 329 may be communicated to each network address included or added to the subnet 146A/204. A new node 106 or a node 106 not present in the status list 314 may receive the join message 329 and engage with the first node 106A. The join message 329 may be periodically broadcast. For instance, the join message 329 may be broadcast each time the election operation is performed, each time a service is to be executed, following an upgrade or change to the subnet 146A/204, or according to another suitable schedule.

Additionally, in some embodiments, the first node 106A may only generate and communicate the join message 329 when it is selected to execute a service. In these embodiments, other nodes 106 may not communicate the join message 329 if they are not selected to execute the service.

The first node 106A may include a service module 312. The service module 312 may be configured to execute the service in the subnet 146A/204. In some embodiments and with some services, the first node 106A may execute the service without oversight by the administration device 102/202. Generally, the service may be any operation or process that is performed by the nodes 106 of the subnet 146A/204. The service may be an operation that coordinates or pulls information (e.g., device status) from the nodes 106, processes the information to generate a result or a product, and communicates the result or the product to the administrative device 102/202. Examples of the service may include preboot services (e.g., preboot execution environment (PXE) services), device discovery services and media streaming services (e.g., universal plug and play (UPnP)). A service may be a Windows service, Linux/Unix daemon, standard process, or may be a service within a given process that can be enabled and disabled.

As discussed above, the service module 312 may generate a product or a result of service (in FIG. 3 "Results/Products of Service 308). The results or products 308 may be communicated to the administrative device 102/202 by the service module 312. Thus, the administrative device 102/202 may monitor the subnet 146A/204 using results or products 308 communicated from the service module 312. The results or products 308 may be communicated without the communication between the administrative device 102/202 and remaining nodes (e.g., the second and third nodes 106B and 106C) other than the first node 106A. For instance, the service may be executed by the first node 106A, which may include surveying or communicating individually with the other nodes 106. The first node 106A may gather information from the nodes 106, and then communicate the result or products 308 to the administrative device 102/202. Accordingly, the administrative device 102/202 may not have to communicate with each of the nodes 106, which may reduce computing resources expended by the administrative device 102/202 to perform the service.

The administrative device 102/202 may include a host device (e.g., 202 of FIG. 2) in the subnet 146A/204. Additionally or alternatively, the administrative device 102/202 may include a core device (e.g., 102 of FIG. 1) that is communicatively coupled to the subnet 146A/204. For instance, the administrative device 102/202 may be a core server of a cloud-based network. In these and other embodiments, performance of the local election operation and the execution of the services may be considered edge computing operations. Edge computing operations generally which may improve latency to improve operation of the cloud-based network.

The election module 144 may be configured to generate and communicate a notification signal 310. The election module 144 may communicate the notification signal 310 to the administration device 102/202. In some embodiments, the notification signal 310 is configured to indicate to the administration device 102/202 that the first node 106A is elected for exclusive execution of the service in the subnet 146A/204. The administrative device 102/202 may be informed of the election and may initiate communication with the first node 106A.

In some embodiments, the notification signal 310 may be received by the management module 148. The management module 148 may track which of the nodes is selected to execute the service. Additionally, the management module 148 may periodically communicate with the first device 106A and/or trigger execution of the service via the first device 106A.

Figure 4:
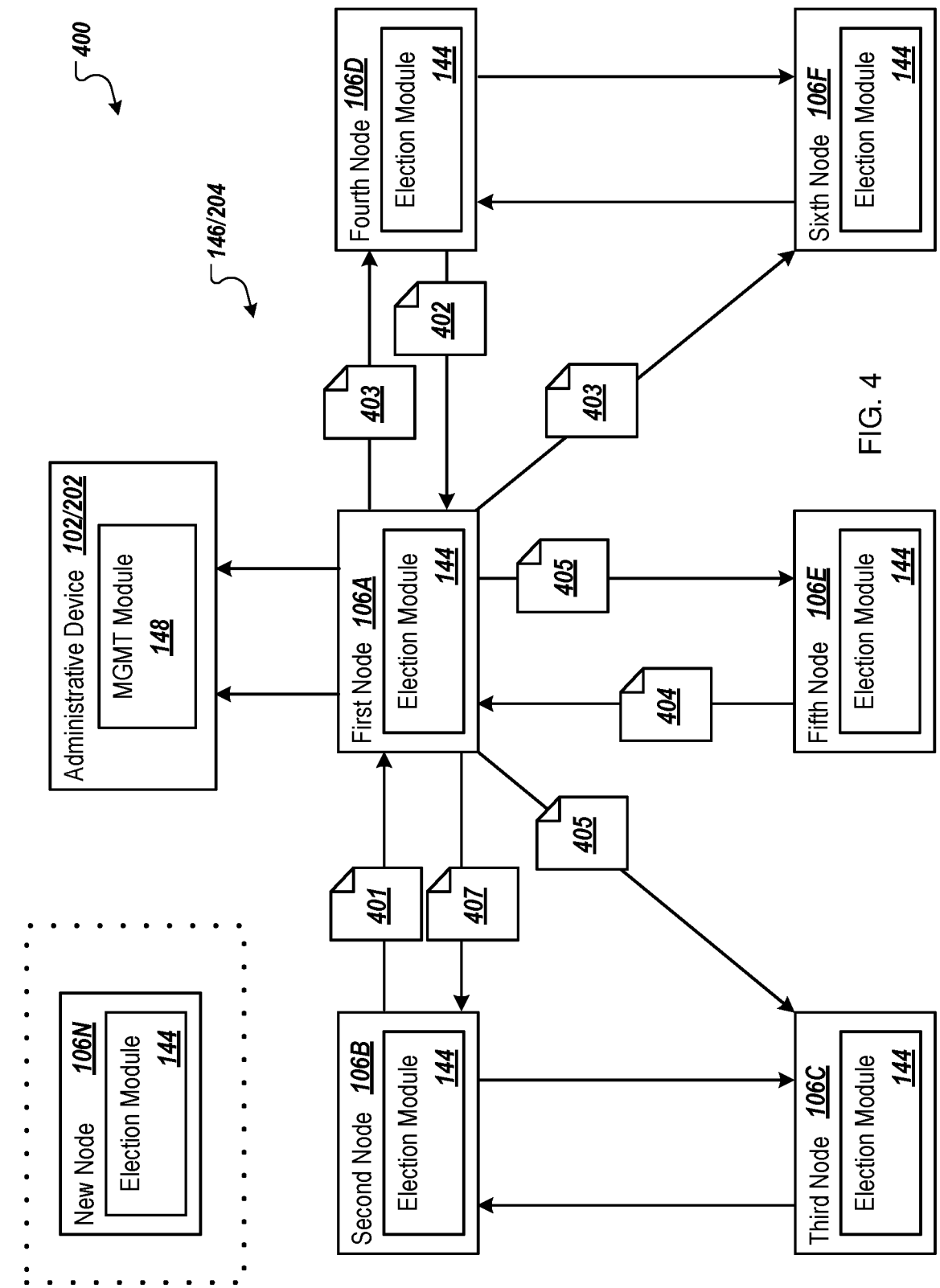
FIG. 4 depicts an example communication process that may be implemented in the first or second operating environments of FIGS. 1 and 2.

FIG. 4 depicts an example communication process 400 that may be implemented in some embodiments of the subnet 146A/204. The communication process 400 may be implemented to propagate election information and to disseminate information regarding the nodes 106 in the subnet 146A/204. As described elsewhere in the present disclosure, the nodes 106 communicate using ping messages (e.g., 302 and 306 of FIG. 3) and response messages (e.g., 304). The ping messages include direct information and indirect information that are pulled from a locally stored status list (e.g., 314). The direct information and the indirection information are used in local election operations implemented by the nodes 106. Results of the local election are added to the status list and is further propagated to one or more other nodes 106.

In general, the communication process 400 includes a set of operations that are perform during a series of time periods. The time period is referred to as a SWIM period in the present disclosure. The SWIM period may be a short period of time such as 5 seconds, 8 seconds, 10 seconds, 12 seconds, or another suitable period of time. In these embodiments, the number of SWIM periods before the pools are re-populated may be related to the number of nodes 106 in the subnet 146. For instance, the number of SWIM periods may be equal to one less than the number of nodes, equal to about one-third of the number of nodes, and the like.

The set of operations includes identifying one or more of the nodes 106 to receive messages and identifying one or more nodes 106 about which information is communicated. The message is sent for the current SWIM period to the node identified to receive the message. The message includes information about the identified nodes 106. These nodes 106 may then be removed from pools from which the nodes 106 are identified. After each of the nodes 106 has received a message, the pools are re-populated and the communication process 400 is repeated.

FIG. 4 is described with combined reference to FIGS. 5A-5D. FIGS. 5A-5D depict a simplification of an example status list 314 through the communication process 400. In particular, a first view 500A of FIG. 5A depicts the status list 314 at a first SWIM period. A second view 500B of FIG. 5B depicts the status list 314 at a second SWIM period. A third view 500C of FIG. 5C depicts the status list 314 at a third SWIM period. A fourth view 500D of FIG. 5D depicts the status list 314 at a fourth SWIM period.

Each of the views 500A-500D depicts the nodes 106 in the subnet 146A/204, machine states 502 (as active or inactive), node election state 504 (selected or passive), and election scores 506 of each of the nodes 106. As discussed elsewhere in the present disclosure, the election score 506, the node election state 504, the machine state 502, or combinations thereof may be updated and changed as the ping or response messages (401, 402, 403, 404, 405, and 407) are communicated in the subnet 146A/204. In other embodiments other information (device information, network address information, device type, device capability, etc.) may be included in the status list 314. The views 500A-500D of the status list 314 may also include a received node pool 508 and an ancillary node pool 510. The received node pool 508 indicates whether the node 106 has received a ping message that is communicated by the first node 106A. The ancillary node pool 510 indicates whether information concerning or pertaining to the node 106 has been included in one of the messages.

Referring to FIG. 4, the communication process 400 may be implemented at the first node 106A. It may be appreciated with the benefit of this disclosure that any of the nodes 106 may be configured to perform the communication process 400.

At or during a first SWIM period, which is represented by the first view 500A, the first node 106A may identify one or more receiving nodes. Identification of the receiving node may be performed randomly. Random identification may help distribute information evenly in the subnet 146A/204. The receiving node(s) may be randomly identified from the nodes 106 in the receiving node pool 508. At the first SWIM period, the receiving node pool 508 may include all the nodes 106 in the subnet 146A/204 except the first node 106A. The first node 106A may be removed from the receiving node pool 508 because it is the node 106 generating and communicating a ping message.

A number of receiving nodes identified may be set by the first node 106A. For instance, responsive to received indirect information being new to the status list 314, a number of identified receiving nodes may be set to more than one node (e.g., at least three nodes). Otherwise, the number of the identified receiving nodes during each SWIM period may be set to one node. For instance, the second node 106B may communicate a first ping message 401 to the first node 106A. The first ping message 401 may include indirect information about the third node 106C. The first node 106A may review the indirect information and determine that it is new information. For example, the third node 106C reported to be active instead of inactive, which may be new to the first node 106A. Responsive to the information being new, the first node 106A may set the number of identified receiving nodes to three for each ping message.

The first node 106A may then identify one or more ancillary nodes. The ancillary nodes are the nodes 106 to which indirect information is related. Identification of the ancillary node may be performed randomly or using a randomizing algorithm or pseudo-randomizing algorithm. Random identification may help distribute information evenly in the subnet 146A/204. The ancillary nodes may be randomly identified from the ancillary node pool 510. At the first SWIM period shown in the first view 500A, the ancillary node pool 510 may include all the nodes 106 in the subnet 146A/204 except the first node 106A. The first node 106A may be removed from the ancillary node pool 510 because information about the first node 106 will be included as direct information of an outgoing ping messages (403, 405, and 407).

The number of ancillary nodes may be based on a number of nodes 106 in the subnet 146A/204, a packet size of the outgoing ping message, another factor, or some combination thereof. In some embodiments, the number of ancillary nodes may include three nodes, for instance. In other embodiments more than three or fewer than three ancillary nodes may be randomly identified for outgoing ping messages (403, 405, and 407).

The first node 106A may generate a first outgoing ping message 403 for the first SWIM period. The first outgoing ping message 403 may include indirect information related to the identified ancillary nodes 106 and direct information of the first node 106A. The first node 106A may communicate the first outgoing ping message 403 to one or more or each of the identified receiving nodes 106. For example, the fourth node 106D and the sixth node 106F may be identified as the receiving nodes and the first outgoing ping message 403 may include indirection information related to the third node 106C.

The first node 106A may remove the identified ancillary nodes (e.g., the third node 106C) from the ancillary node pool 510, which is indicated by an "X" in the ancillary node pool 510. Thus, in subsequent SWIM periods (e.g., in the second, third, and fourth views 500B, 500C, and 500D), the ancillary nodes already identified may not be considered for subsequent outgoing ping messages. The first node 106A may also remove the identified receiving nodes 106 from the receiving node pool 508. Thus, in subsequent SWIM periods, the receiving nodes (e.g., the fourth node 106D and the sixth node 106F) already identified to receive the ping message may not be considered for subsequent ping messages.

The first node 106 may determine whether there are nodes 106 remaining in the receiving node pool 508 and/or in the ancillary node pool 510. For instance, in the second view 500B for the second SWIM period, the second, third, and fifth node 106B, 106C, and 106E are remaining in the receiving node pool 508. Accordingly, the first node 106A may repeat the above steps. That is, the first node 106A may identify receiving nodes and ancillary nodes, generate the outgoing ping message, communicate an outgoing ping message to the identified receiving nodes that includes information of the ancillary nodes, remove identified nodes from the pools 508 and 510, and determine whether nodes remain in the pools 508 or 510.

In the example depicted in FIGS. 4-5D, the first node 106A may identify the fifth node 106E and the third node 106C as receiving nodes in the second SWIM period and identify the second node 106B as the receiving node for a third SWIM period. The first node 106A may identify the second node 106B as the ancillary node in the second SWIM period and identify the fifth node 106E as the ancillary node in the third SWIM period. The first node 106A may communicate a second outgoing ping message 405 to the fifth node 106E and to the third node 106C that includes information related to the second node 106B. Additionally, the first node 106A may communicate a third outgoing ping message 407 to the second node 106B. The third outgoing ping message 407 may include indirect information related to the fifth node 106E.

Following the third SWIM period and communication of the third outgoing ping message 407, all nodes have been removed from the receiving node pool 508. Accordingly, following the third SWIM period, the first node 106A may repopulate the receiving node pool 508 and/or the ancillary node pool 510. The communication process 400 may proceed from the fourth view 500D to the first view 500A, which may re-introduce the nodes 106 into the receiving node pool 508. The first node 106A may perform the communication process 400 again over the course of a subsequent series of SWIM periods. Thus, the information is consistently propagated throughout the subnet 146A/204.

In addition, in some embodiments of the communication process 400 response messages (in FIGS. 4, 402 and 404) may be communicated responsive to the ping messages 401, 403, 405, and 407. The response messages 402 and 404 may include direct information and indirect information as described with reference to FIG. 3.

In some embodiments, the ancillary nodes and the receiving nodes are not both identified in each of the SWIM periods. For instance, in some embodiments, the receiving nodes are selected and then the ping messages are continually sent to those receiving nodes until information regarding all ancillary nodes has been communicated. Similarly, in some embodiments, the ancillary nodes may be identified and then the information related to the ancillary nodes are communicated to each of the receiving nodes.

In some circumstances, one or more aspects of propagation in the communication process may be modified. For example, the first ping message 401 may be a first communication from the second node 106B received by the first node 106A. The first node 106A may determine that the first ping message 401 is the first communication received from the second node 106B. In response, the first node 106A may prioritize a communication of the first outgoing ping message 403 to the second node 106B instead of randomly identifying the receiving node as described above. Communication of the first outgoing ping message 403 to the second node 106B may ensure the second node 106B does not determine itself to be elected for the service.

In other circumstances, a local election operation may result in a change in the election state (e.g., 504 in FIGS. 5A-5D) of the first node 106A. For instance, the first node 106A may become selected to execute the first service in the subnet 146A/204. In response to the change in election state, the first node 106A may determine which of the nodes 106 was previously selected to execute the service prior to the change in the current state. The first node 106A may prioritize communication of the first outgoing ping message 403 to the node 106 that was previously selected to execute the service instead of randomly identifying receiving nodes. Prioritization of the outgoing ping message may enable the current election state of the first node 106A to be reported to the other node quickly to ensure the execution of the service is not duplicated.

In yet other circumstance, the first node 106A may determine that one of the nodes 106 is removed from the status list 314. For instance, the first ping message 401 may include information regarding the third node 106C. However, the first node 106A may detect that the status of the third node 106C as inactive or that the third node 106C is removed from the status list 314. Accordingly, the first node 106A may replace the third node 106C in the status list 314 and prioritize communication of the first outgoing ping message 403 to the third node 106C instead of randomly identifying the receiving nodes. Prioritization of the communication may ensure the third node 106C is not simultaneously elected to execute the service.

In some embodiments, the communication process 400 may include operations implemented by a new node 106N. The new node 106N may represent a computing system that is introduced to the subnet 146A/204, reactivated in the subnet 146A/204, or attempts to enters the subnet 146A/204 (e.g., following a reconfiguration, etc.). In these and other circumstances, the new node 106N and the nodes 106 may perform a subnet initialization operation.

In some embodiments, the subnet initialization operation may include a set of communications, which attempt to initiate communication between the new node 106N and the nodes 106 already present in the subnet 146A/204. The new node 106N may start by communicating a multicast message in the subnet 146A/204. The multicast message may be communicated to at least a subnet of the nodes 106 in the subnet 146A/204. The nodes 106 already present in the subnet 146A/204 may receive the multicast message. The nodes 106 may determine that the multicast message is a first communication from the new node 106N. In response, the nodes 106 may prioritize a response or ping message to the multicast message. The new node 106N may accordingly begin receiving the response or the ping message, which begins the self-election process. Thus, if the new node 106N receives the response messages to the multicast message, the new node 106N may effectively enter the subnet 146A/204 and be included in remaining portions of the communication process 400.

If the new node 106N does not receive a response to the multicast message, then the new node 106N may communicate a broadcast message. The broadcast message may be communicated to each of the nodes 106 or potential in the subnet 146A/204. Similar to the operations above, the nodes 106 already present in the subnet 146A/204 may determine that the broadcast message originates at a node that is not present in the status list 314. The nodes 106 may add the new node 106N to the status list 314 and prioritize the response or ping message to the new node 106N. Thus, if the new node 106N receives a response to the broadcast message, the new node 106N may enter the subnet 146A/204 and be included in remaining portions of the communication process 400.

Additionally or alternatively, in some embodiments, the new node 106N and/or the nodes 106 in the subnet 146A/204 may be configured to listen for ARP messages. The nodes 106 or the new node 106N may detect ARP messages from unknown IP addresses. The nodes 106 or the new nodes 106N may be configured to respond using prioritized response or ping messages to the unknown IP addresses. If the new node 106N receives the response or the ping messages, the new node 106N may enter the subnet 146A/204 and be included in remaining portions of the communication process 400. If the new node 106N does not receive any responses to the ARP message, the new node 106N may determine that the new node 106N is an initial node of the subnet 146A/204.

In the subnet initialization operation, the new node 106N may fill its status list 314 with election information from the response or ping messages communicated from the nodes 106 in the subset 146A/204. The new node 106N may accordingly perform the self-election process once it has received election states regarding the threshold number of nodes 106 as described elsewhere in the present disclosure.

Figure 6:
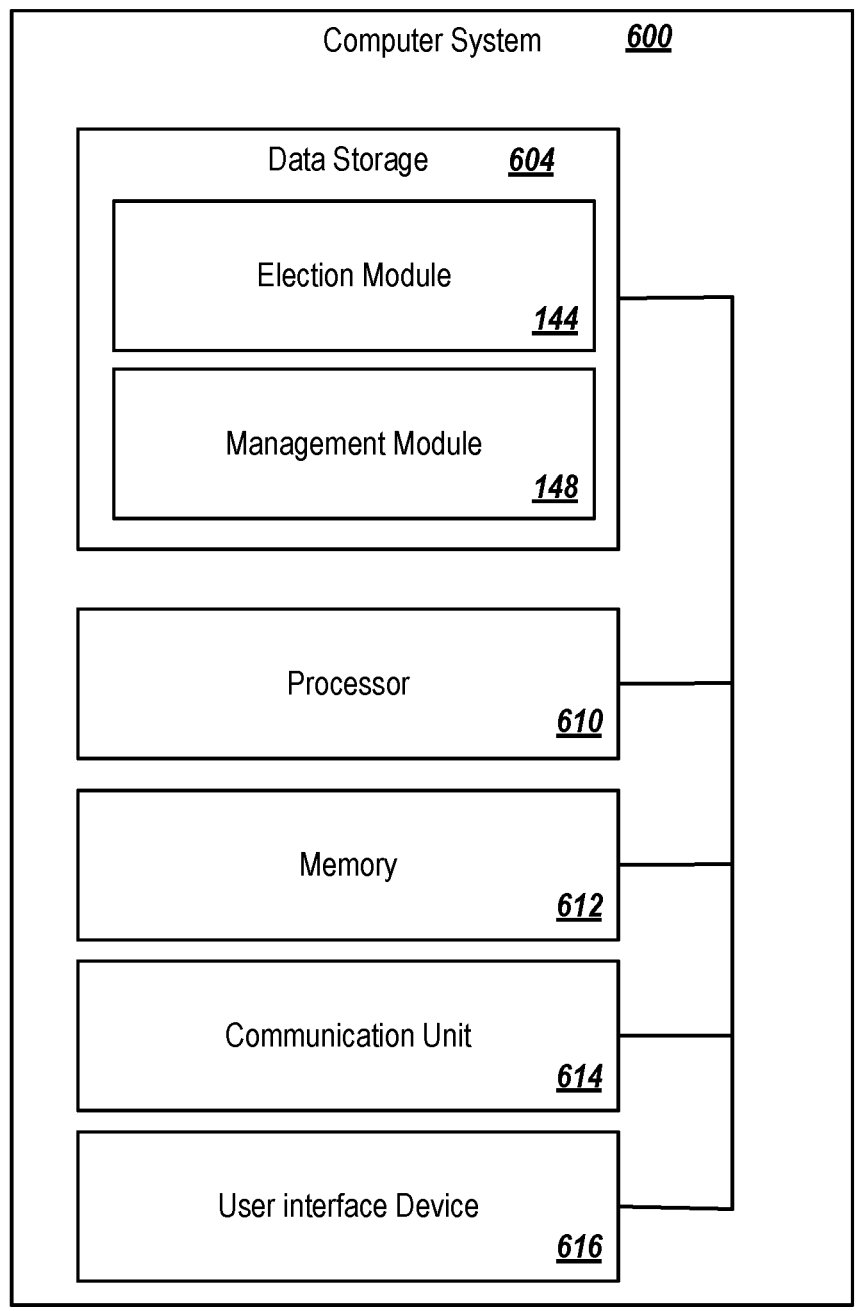
FIG. 6 illustrates an example computing system configured for self-election of a node in a subnet.

FIG. 6 illustrates an example computing system 600 configured for self-election of a node in a subnet according to at least one embodiment of the present disclosure. The computing system 600 may be implemented in the operating environments 100 or 200 of FIG. 1 or 2, for instance. Examples of the computing system 600 may include the node 106, the host device 202, the core server 102, or some combination thereof. The computing system 600 may include one or more processors 610, a memory 612, a communication unit 614, a user interface device 616, and a data storage 604 that includes the election module 144 and the management module 148 (collectively, modules 144/148).

The processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 6, the processor 610 may more generally include any number of processors configured to perform individually or collectively any number of operations described in the present disclosure. Additionally, one or more of the processors 610 may be present on one or more different electronic devices or computing systems. In some embodiments, the processor 610 may interpret and/or execute program instructions and/or process data stored in the memory 612, the data storage 604, or the memory 612 and the data storage 604. In some embodiments, the processor 610 may fetch program instructions from the data storage 604 and load the program instructions in the memory 612. After the program instructions are loaded into the memory 612, the processor 610 may execute the program instructions.

The memory 612 and the data storage 604 may include computer-readable storage media for carrying or having computer-executable instructions or data structures stored thereon. Such computer-readable storage media may include any available media that may be accessed by a general-purpose or special-purpose computer, such as the processor 610. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 614 may include one or more pieces of hardware configured to receive and send communications. In some embodiments, the communication unit 614 may include one or more of an antenna, a wired port, and modulation/demodulation hardware, among other communication hardware devices. In particular, the communication unit 614 may be configured to receive a communication from outside the computing system 600 and to present the communication to the processor 610 or to send a communication from the processor 610 to another device or network (e.g., 108 or 120 of FIG. 1 or FIG. 2).

The user interface device 616 may include one or more pieces of hardware configured to receive input from and/or provide output to a user. In some embodiments, the user interface device 616 may include one or more of a speaker, a microphone, a display, a keyboard, a touch screen, or a holographic projection, among other hardware devices.

The modules 144/148 may include program instructions stored in the data storage 604. The processor 610 may be configured to load the modules 144/148 into the memory 612 and execute the modules 144/148. Alternatively, the processor 610 may execute the modules 144/148 line-by-line from the data storage 604 without loading them into the memory 612. When executing the modules 144/148, the processor 610 may be configured to perform one or more processes or operations described elsewhere in this disclosure.

Modifications, additions, or omissions may be made to the computing system 600 without departing from the scope of the present disclosure. For example, in some embodiments, the computing system 600 may not include the user interface device 616. In some embodiments, the different components of the computing system 600 may be physically separate and may be communicatively coupled via any suitable mechanism. For example, the data storage 604 may be part of a storage device that is separate from a device, which includes the processor 610, the memory 612, and the communication unit 614, that is communicatively coupled to the storage device. The embodiments described herein may include the use of a special-purpose or general-purpose computer including various computer hardware or software modules, as discussed in greater detail below.

Figure 7A:
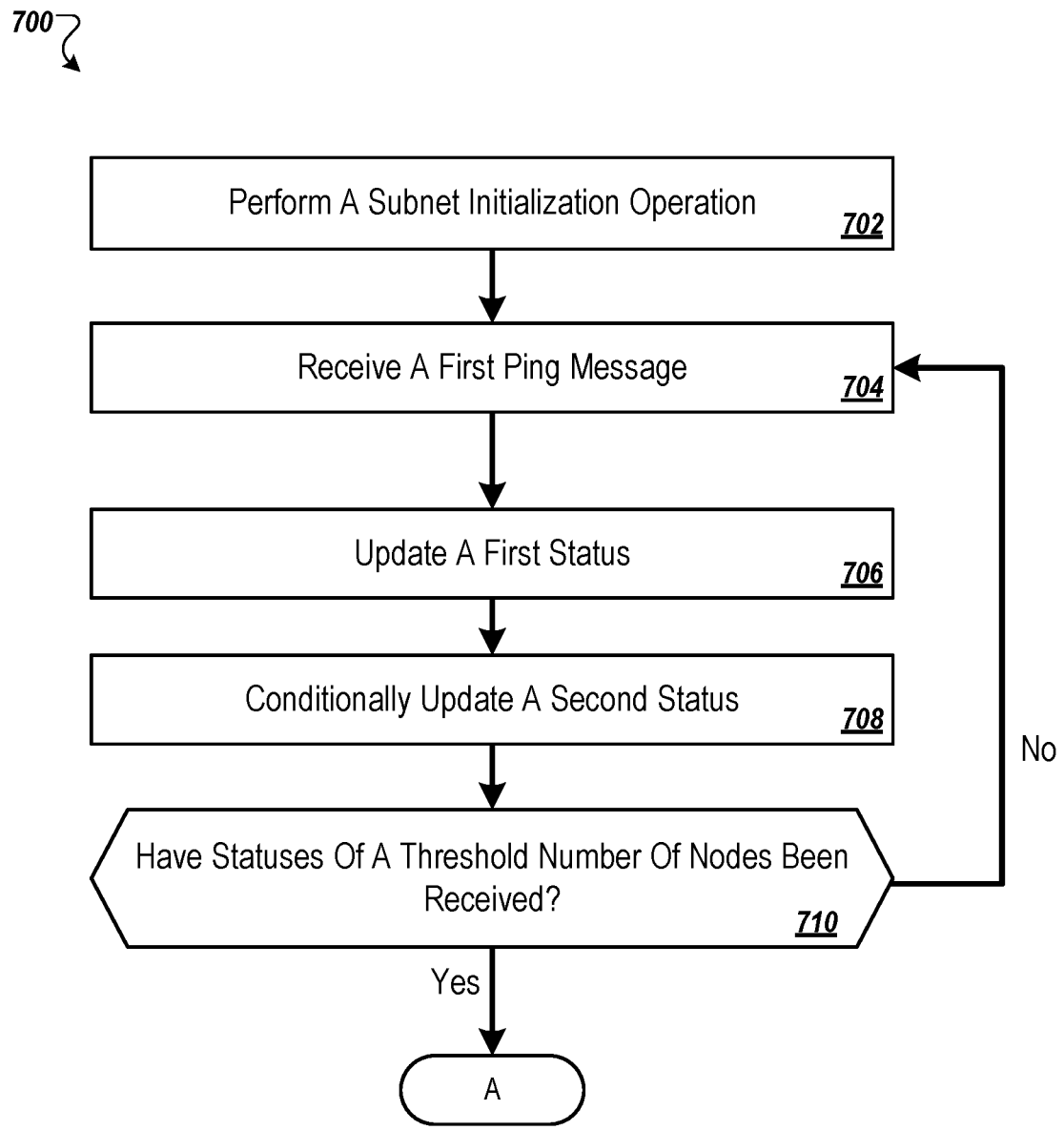
FIGS. 7A and 7B are a flow chart of an example method of self-election of a node in a subnet.
Figure 7B:
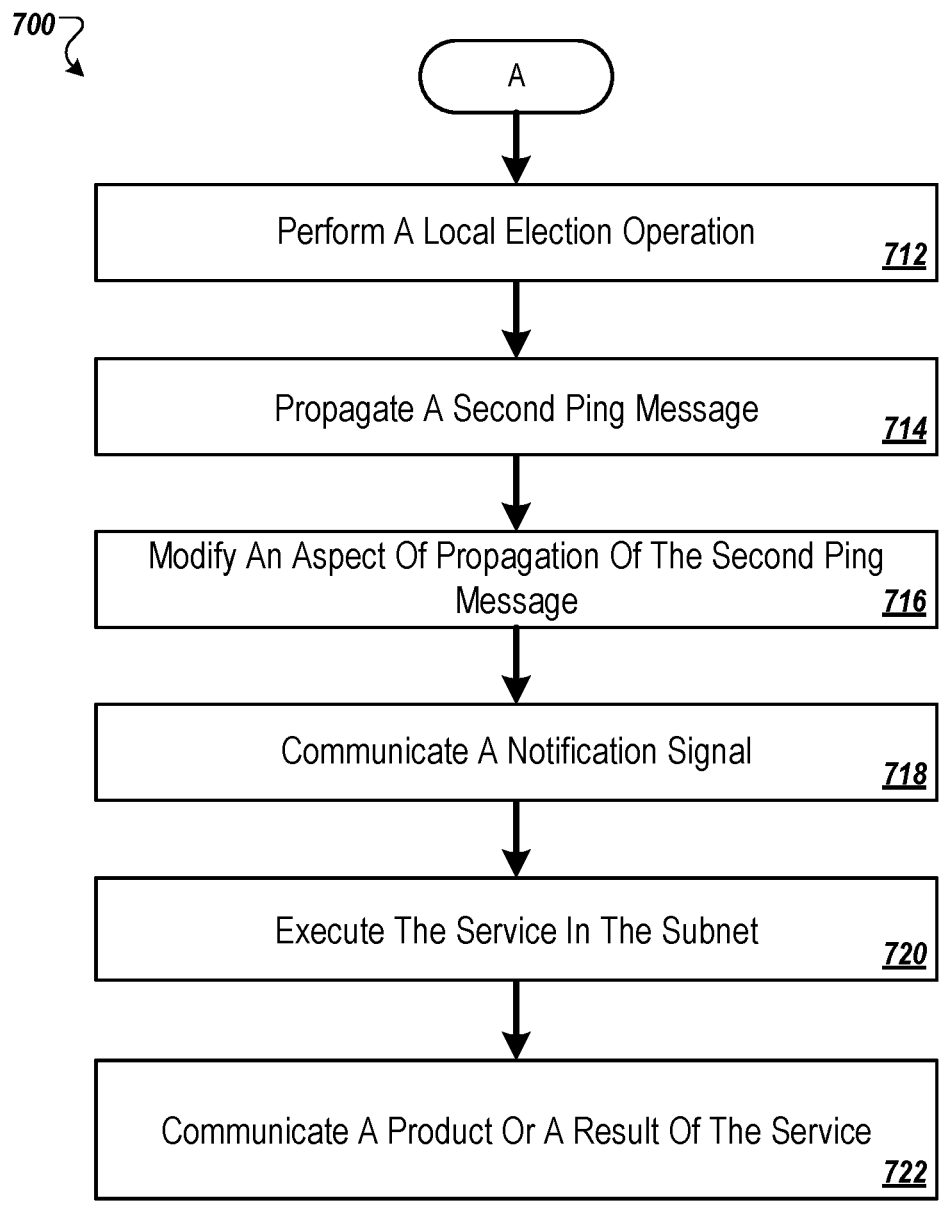

FIGS. 7A and 7B are a flow chart of an example method 700 of self-election of a node in a subnet, according to at least one embodiment described in the present disclosure. As described elsewhere in the present disclosure, the method 700 may involve or may be based on information distribution using a modified SWIM protocol and local node election operations. The method 700 may be performed in a suitable operating environment such as the first operating environment 100 or second operating environment 200 of FIGS. 1 and 2, respectively. The method 700 may be performed by one or more of the nodes 106 described elsewhere in the present disclosure or by another suitable computing system, such as the computing system 600 of FIG. 6. The node implementing the method 700 may be included in a cloud-based networked system, an on-premises system, a managed network, managed subnetwork, or another suitable network computing environment.

Referring to FIG. 7A, the method 700 may begin at block 702 in which a subnet initialization operation may be performed. The subnet initialization operation may be configured to determine whether a new node (e.g., the node 106) is a first or only node in a subnet or whether the node is being incorporated into an existing subnet.

At block 704, a first ping message may be received. The first ping message may be received by a first node, which may be included in a subnet with multiple other nodes. The first ping message may be unicast or directly communicated from a second node, which may also be included in the subnet. Additionally, the first ping message may include direct information and indirect information. The direct information may be related to the second node. It is termed "direct" information because this information is related to the node that communicated the ping message. The indirect information may be related to a third node, which is included in the subnet. The indirect information includes information that the second node (communicating the ping message) has received from another node of the subnet. In some implementations, the first ping message may include indirect information related to multiple nodes other than the communicating node. For instance, the first ping message may include indirect information related to two or more (e.g., three, four, . . . ten) nodes. The number of nodes about which the indirect information relates to may be based on a particular packet size for the ping message, a number of nodes in the subnet, bandwidth available, and the like.

In some embodiments, the first ping message and one or more other messages communicated in the subnet may be formatted according to the UDP. In other embodiments, one or more of the messages may be communicated among the nodes and administrative devices using another protocol as will be understood by one with skill in the art.

In some embodiments, the direct information may include a first election state and a first machine state of the second node. In these and other embodiments, the indirect information may similarly include a second election state and a second machine state of the third node. The first node may weigh the direct information or the indirect information differently. In general, the direct information may be seen as more reliable than indirect information.

At block 706, a first status may be updated. The first status may be related to the second node. The first status of the second node may be updated consistent with the direct information. The status may include information that is relevant to the nodes on the network during an election process such as a machine state, machine information, an election state, and the like. For instance, the direct information may indicate that the second node is selected to execute a service in the subnet. The first node may update or change the status of the second node in the status list to reflect its status as "Selected" for a particular service. The first status may be stored in the status list, such as the status list 314. The status list may be stored locally at the first node.

At block 708, a second status may be conditionally updated. The second status is related to the third node in the status list. The second status of the third node may be updated based at least partially on a date and a content of the indirect information in the first ping message. For example, responsive to the indirect information being older than a status for the third node in the status list, the first node may not update the second status. Similarly, if the second node is identified as inactive, the first node may not update the second status without taking additional actions.

At block 710, it may be determined whether statuses of a threshold number of nodes in the subnet are received. For instance, it may be determined whether the status list includes updated statuses of the threshold number of nodes. In these and other embodiments, the threshold may be 80%, 85%, 90%, 95% etc. of the total number of nodes or the nodes other than the first node in the subnet. For instance, the subnet might include 40 nodes and the threshold may be set to 80%. Accordingly, in this example, when the status list includes updated statuses of thirty-two nodes, the threshold number of nodes may be met.

In some embodiments, the first ping message is one of multiple ping messages received by the first node. Each ping message of the multiple ping messages includes a node number. The node number may indicate a number of nodes the transmitting node has identified in the subnet. In these and other embodiments, the determining whether statuses of the threshold number of nodes are update includes averaging the number of nodes reported in the node numbers of the multiple ping messages and applying the threshold number against the average number of nodes.

Responsive to the threshold number of nodes not being received ("NO" at block 710) the method 700 may proceed to block 704. As described above, ping messages may be continued to be received. The method 700 may proceed through blocks 706, 708, and 710 until the threshold number of nodes have been received.

Referring to FIG. 7B, responsive to the threshold number of nodes being received ("YES" at block 710), the method 700 may proceed to block 712. At block 712, a local election operation may be performed. The local election operating may include application of one or more election rules to information stored in the status list. In some embodiments, the election operation may be performed entirely or substantially entirely at the first node using information in the status list. The local election operation may determine which node of the subnet is selected to execute a service on the subnet.

At block 714, a second ping message may be propagated. In some embodiments, the second ping message may be propagated to at least one randomly identified additional node of the subnet. The second ping message may include direct information regarding the first node and indirect information regarding at least one other node of the subnet.

At block 716, at least one aspect of the propagation may be modified. The aspect of the propagation may be modified to achieve some benefit to the subnet. For instance, propagation of multiple ping messages may increase a rate of dissemination of information in the status list through the subnet. Some example aspects that may be modified may include which node of the subnet is chosen to receive a ping message, a number of ping messages communicated, contents of the ping messages, or some combination thereof. One or more of these aspects may be modified based on information in the first ping message or second ping message, information in the status list, comparisons therebetween, similar information and comparisons, or combinations thereof.

At block 718, a notification signal may be communicated. The notification signal may be communicated to an administration device. The administrative device may include a host device in the subnet. Additionally or alternatively, the administrative device may include a core device communicatively coupled to the subnet. In some embodiments, the administrative device may be a core server of a cloud-based network. In these and other embodiments, the method 700 may be implemented at an edge computing operation. Data and information created and processed in the subnet, which may improve latency of the operations performed in the method 700. In some embodiments, the notification signal is configured to indicate to the administration device that the first node is elected for exclusive execution of the service in the subnet. The administrative device may be informed of the election and may communicate with the first node.

At block 720, the service may be executed. The service may be executed by the first node in the subnet. The service may be executed without oversight by an administration device or substantially independently. At block 722, a product or a result of the service may be communicated. The product or the result of the service may be communicated to the administrative device. The product or the result of the service may be communicated without the communication between the administrative device and remaining nodes other than the first node. For instance, the service may be executed by the first node. The first node may then communicate the result to the administrative device, which may reduce or eliminate a need for the administrative device to communicate with each of the other nodes to implement the service.

Figure 8:
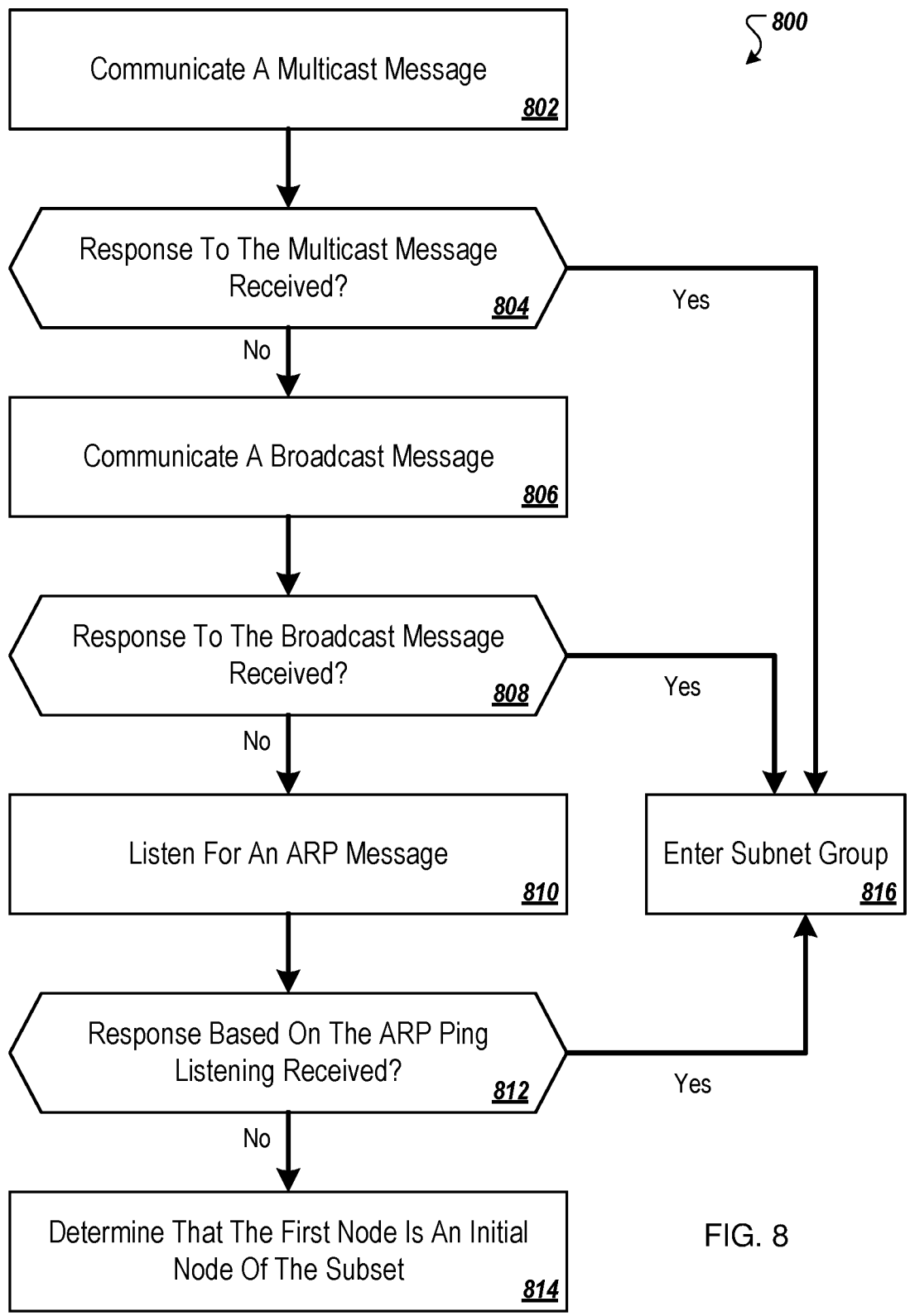
FIG. 8 is a flow chart of an example method of performing a subnet initialization operation.

FIG. 8 is a flow chart of an example method 800 of performing a subnet initialization operation, according to at least one embodiment described in the present disclosure. The method 800 may be implemented as a part or portion of another method. For instance, the method 800 may be implemented in block 702 of the method 700. The method 800 or some steps therein may be performed responsive to entry of a node into a subnet. In other embodiments, the method 800 or some steps therein may be performed following reactivation, or reconfiguration of a node in a subnet.

The method 800 may begin in block 802 in which a multicast message may be communicated. The multicast message may be communicated by a new node. The multicast message may be communicated to a subset of nodes in a subnet. At block 804, it may be determined whether a response to the multicast message is received. For instance, the subset of nodes may be configured to determine that the multicast message originated at a node (e.g., the new node) that is not present in its status list. In response to the new node not being present in the status list, the subset of nodes may prioritize a communication to the new node. Some additional details of prioritization of the communication to the new node is described with reference to the method 1200. Responsive to receipt of a response message to the multicast message ("YES" at block 804), the method 800 may proceed to block 816, in which the new node enters the subnet. For example, the new node receives election information from the subset of nodes according to the modified SWIM-based protocol and performs local election processes as described elsewhere in the present disclosure.

Responsive to a failure to receive a response message to the multicast message ("NO" at block 804), the method 800 may proceed to block 806. For example, multicast channels may be disabled or none of the subset of nodes may be present on the subnet. At block 806, a broadcast message may be communicated. At block 808, it may be determined whether a response to the broadcast message is received. As described above, the subset of nodes may respond to the broadcast message in response to the broadcast message originating at the new node. Responsive to receipt of a response message to the broadcast message ("YES" at block 808), the method 800 may proceed to block 816, in which the new node enters the subnet. Responsive to failure to receive a response message to the broadcast message ("NO" at block 808), the method 800 may proceed to block 810.

At block 810, the new node or the subset of the nodes may listen for an ARP message communicated in the subnet. Nodes in the subnet may be configured to listen for the ARP messages and/or to respond to the ARP messages that originate at unknown IP addresses. The listening nodes may prioritize communication of a ping message or a response message to the unknown IP address.

At block 812, it may be determined whether a response message or a ping message is received based on ARP listening. Responsive to receipt of a response message based on the ARP message listening ("YES" at block 812), the method 800 may proceed to block 816, in which the new node enters the subnet. Responsive to a failure to receive a response to the ARP listening ("NO" at block 812), the method 800 may proceed to block 814. At block 814, it may be determined that the node preforming the method 800 is an initial node of the subnet.

In some embodiments, block 810 may not be responsive to a failure of a response to the broadcast message or the multicast message. For example, in some embodiments, the broadcast message or the multicast message may not be communicated and instead, listening for ARP messages may occur independently. Additionally, in some instances, block 810 may not occur. For instance, the nodes may not be configured to listen for ARP messages.

Figure 9:
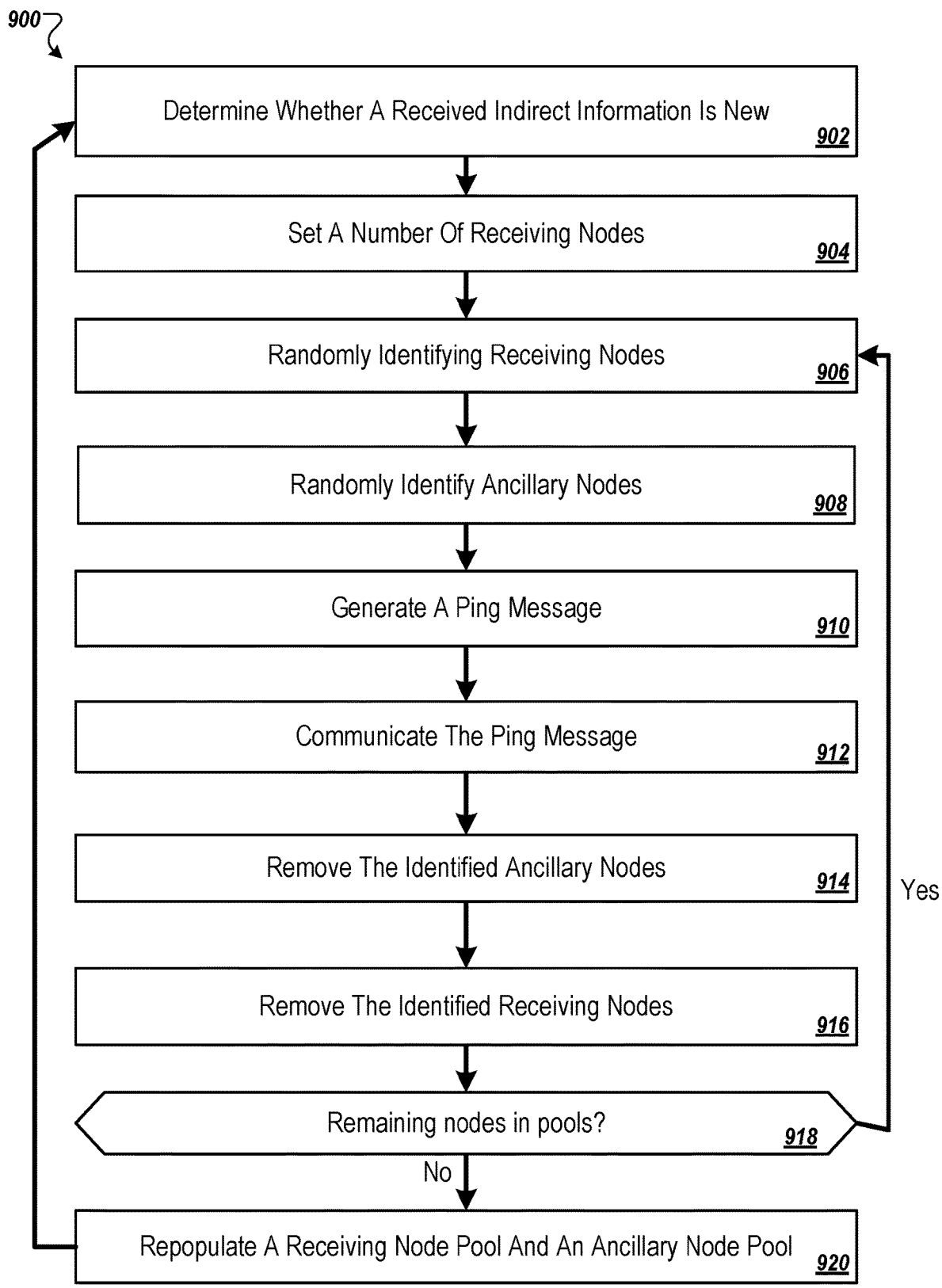
FIG. 9 is a flow chart of an example method of propagating election information.

FIG. 9 is a flow chart of an example method 900 of propagating election information, according to at least one embodiment described in the present disclosure. The method 900 may be implemented as a part or portion of another method. For instance, the method 900 may be implemented in block 714 of the method 700. The method 900 may include a modified form of the SWIM protocol in some embodiments.

The method 900 may begin at block 902 in which it may be determined whether received indirect information regarding a node is new. For example, it may be determined whether the indirect information in a received ping message is new to the status list. At block 904, a number of receiving nodes may be set. The number of receiving nodes may be set based on the determination in block 902. For instance, responsive to the received indirect information being new to the status list, a number of receiving nodes identified during a SWIM period may be set to more than one node (e.g., at least three nodes). Otherwise, the number of receiving nodes identified during the SWIM period may be set to one node.

In some embodiments, one or more of blocks 906, 908, 910, 912, 914, 916, and 918 may be performed for one or more or each SWIM periods. For instance, at a first SWIM period, the method 900 may proceed through blocks 906, 908, 910, 912, 914, 916, and 918. At a next or a subsequent SWIM period, the method 900 may proceed again through blocks 906, 908, 910, 912, 914, 916, and 918.

The SWIM period may be a short period of time such as 5 seconds, 8 seconds, 10 seconds, 12 seconds, or another suitable period of time. A number of SWIM periods may be related to a number of nodes in the subnet in some implementations. For instance, when one receiving node is identified and one ancillary node is identified, the number of SWIM periods may be equal to one less than the number of nodes. In other implementations, three (or another suitable number) of nodes may be selected to receive the ping messages. In these embodiments, the number of SWIM periods may be equal to about one-third of the number of nodes in the subnet.

At block 906, one or more receiving nodes may be randomly identified. The receiving node(s) may be randomly identified from a receiving node pool. The receiving node pool includes nodes in a subnet from which the receiving nodes are identified. The number of receiving nodes may be based on whether indirect information is new to the status list as described above. At block 908, one or more ancillary nodes may be randomly identified. The ancillary node(s) may be randomly identified from an ancillary node pool. The ancillary node pool includes nodes in the subnet from which the ancillary nodes are identified. The number of ancillary nodes may be based on a number of nodes in the subnet, a packet size of the ping message, another factor, or some combination thereof. In some embodiments, the number of ancillary nodes may include nine nodes, for instance. In other embodiments more than nine or fewer than nine ancillary nodes may be randomly identified.

At block 910, a ping message may be generated. The ping message may be generated for a current SWIM period (e.g., a first SWIM period, a second SWIM period, etc.). The ping message may include indirect information related to the identified ancillary nodes and direct information of a first node performing the method 900. At block 912, the ping message may be communicated. The ping message may be communicated to one or more or each of the identified receiving nodes.

At block 914, the identified ancillary nodes may be removed from the ancillary node pool. Thus, in subsequent SWIM periods, the ancillary nodes already identified as subject of the indirect information may not be considered for a subsequent ping message. At block 916, the identified receiving nodes may be removed from the receiving node pool. Thus in subsequent SWIM periods, the receiving nodes that already received the ping message may not be considered for a subsequent ping message. At block 918, it may be determined whether there are nodes remaining in the receiving node pool and/or in the ancillary node pool. For instance, it may be determined whether each of the nodes in the subnet have received the ping message.

If not ("NO" at block 918), the method 900 may proceed through blocks 906, 908, 910, 912, 912, 914, 916, or some combination thereof. In response to all of the nodes in the subnet receiving the ping message ("YES" at block 920), the method 900 may proceed to block 920. At block 920, the receiving node pool and/or in the ancillary node pool may be repopulated. For instance, the nodes in the subnet other than first node performing the method 900 may be added to the receiving node pool and/or in the ancillary node pool. The method 900 may proceed from block 920 to block 902 and may proceed through one or more of the steps of method 900 described above.

In some embodiments, the ancillary nodes and the receiving nodes are not both identified in each of the SWIM periods. For instance, in one embodiment, the receiving nodes are selected and then the ping messages are continually sent to those receiving nodes until information regarding all ancillary nodes has been communicated. Similarly, in some embodiments, the ancillary nodes may be identified and then the information related to the ancillary nodes are communicated to each of the receiving nodes.

Figure 10A:
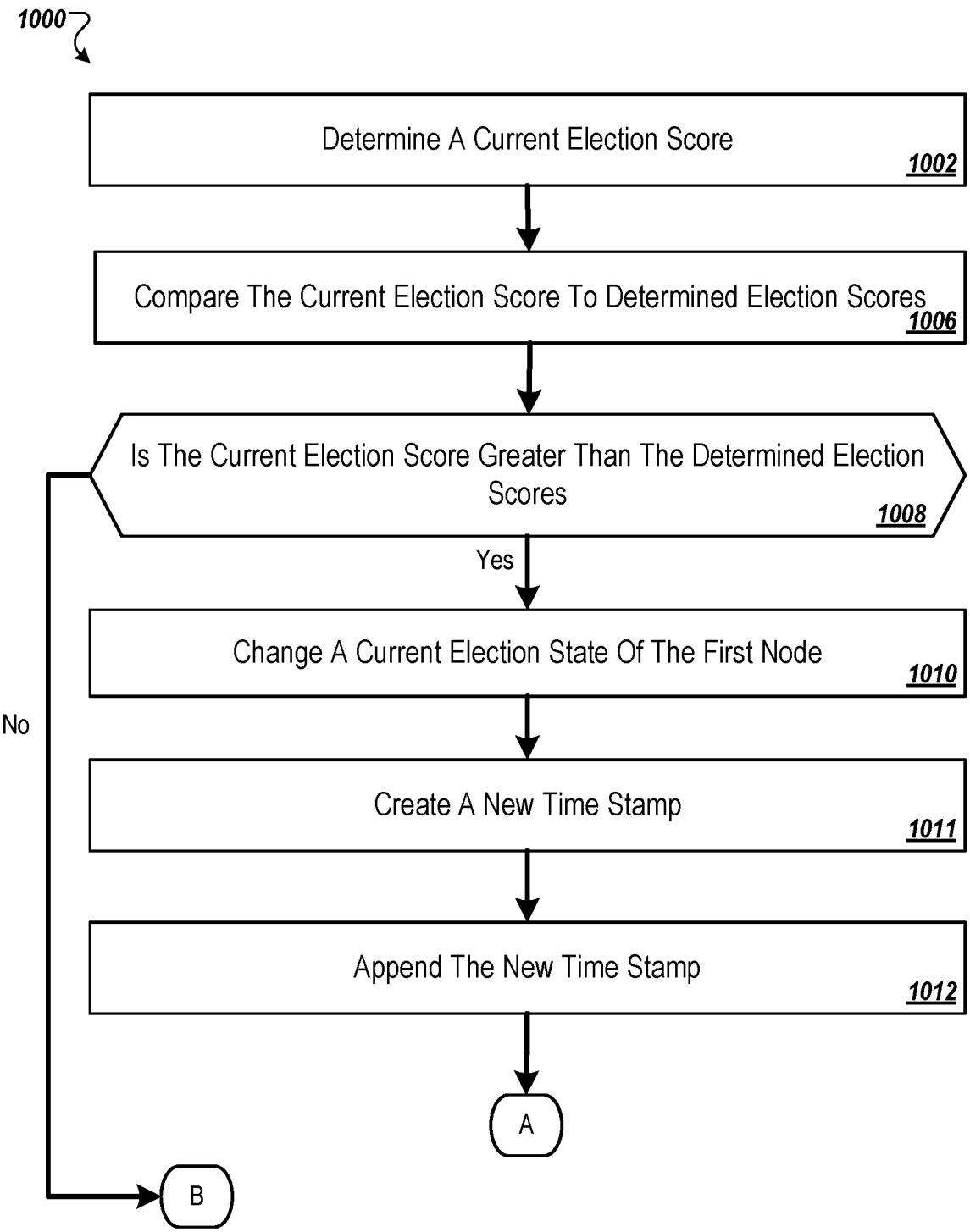
FIGS. 10A and 10B are a flow chart of an example method of performing a local election operation.
Figure 10B:
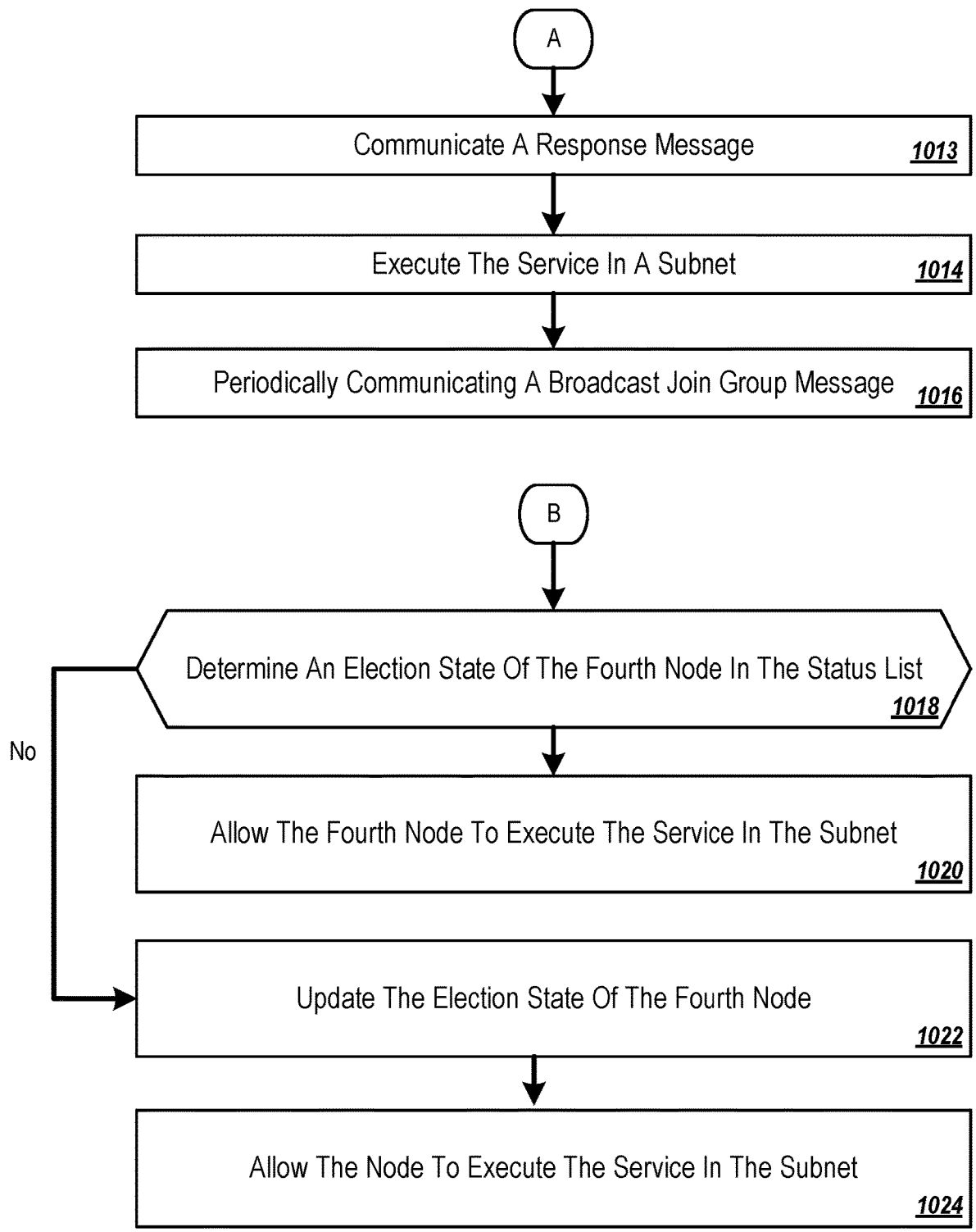

FIGS. 10A and 10B are a flow chart of an example method 1000 of performing a local election operation, according to at least one embodiment described in the present disclosure. The method 1000 may be implemented as a part or portion of another method. For instance, the method 1000 may be implemented in block 712 of the method 700.

Referring to FIG. 10A, the method 1000 may begin at block 1002 in which a current election score is determined. The current election score may be determined for a first node of a subnet including multiple nodes. The current election score may be determined based on election rules that are associated with identifying a particular node from the nodes in the subnet to provide a service.

At block 1006, the current election score may be compared to determined election scores. For instance, the current election score of the first node may be compared to the determined election scores for each of the threshold number of nodes in the subnet. The determined election scores may be determined by the other nodes and communicated to the first node in ping messages.

At block 1008, it may be determined whether the current election score is greater than the determined election scores. Responsive to the current election score being greater than the determined election scores ("YES" at block 1008), the method 1000 may proceed to block 1010. Responsive to the current election score being less than the determined election scores ("NO" at block 1008), the method 1000 may proceed to block 1018 of FIG. 10B.

In some embodiments, the first ping message may include a flag that it indicates that the second node is elected the to execute the service. The flag may add a predefined buffer (e.g., 3 points, 5 points, or another suitable buffer) to its determined election score. The current election score of the first node may only be determined to be greater than the determined election score of the second node when the current election score is greater than a sum of the determined election score for the second node and the predefined buffer.

At block 1010, a current election state of the first node may be changed. The current election state of the first node may be changed to a selected state for the service. The selected state may indicate that the first node is configured to execute the service in the subnet.

At block 1011, a new time stamp may be created for the current election state. At block 1012, the new time stamp may be appending to information representative of the current election state. In some embodiments, the new time stamp is a monotonic increase of a previous time stamp attached to a previous election state of the first node.

Referring to FIG. 10B, at block 1013, a response message may be communicated. The response message may be communicated to the second node. In some embodiments, the response message may include the current election state of the first node and indirect information related to one or more nodes of the subnet. The response message may be configured to indicate that the first node is an elected node for exclusive execution of the service in the subnet. In some embodiments, the response message includes the new time stamp with the current election state.

At block 1014, the service may be executed in the subnet. The service may be executed by the first node and may be executed without or with minimal oversight by an administration device. At block 1016, a join message may be communicated or broadcast periodically. For instance, the join message may be broadcast according to a SWIM period. The join message may be configured to enable re-engagement of any node in the subnet that has dropped out or become inactive.

Blocks 1018, 1020, 1022, and 1024 may be performed responsive to a determination that the current election score of the first node is less than one of the determined election score, which is referred to as the first determined election score. The first determined election score may be associated with a fourth node. At block 1018, an election state of the fourth node may be determined. For instance, the election state of the fourth node may be determined in the status list of the first node. At block 1020, the fourth node may be allowed to execute the service in the subnet. Block 1020 may be executed responsive to the election state of the fourth node indicating that the fourth node is selected to execute the service in the subnet. At block 1022, the election state of the fourth node may be updated. For instance, the election state of the fourth node may be updated in the status list to a selected state. Block 1022 may be performed responsive to the election state of the fourth node indicating that the fourth node is not yet selected to execute the service in the subnet. At block 1024, the fourth node may be allowed to execute the service in the subnet.

Figure 11:
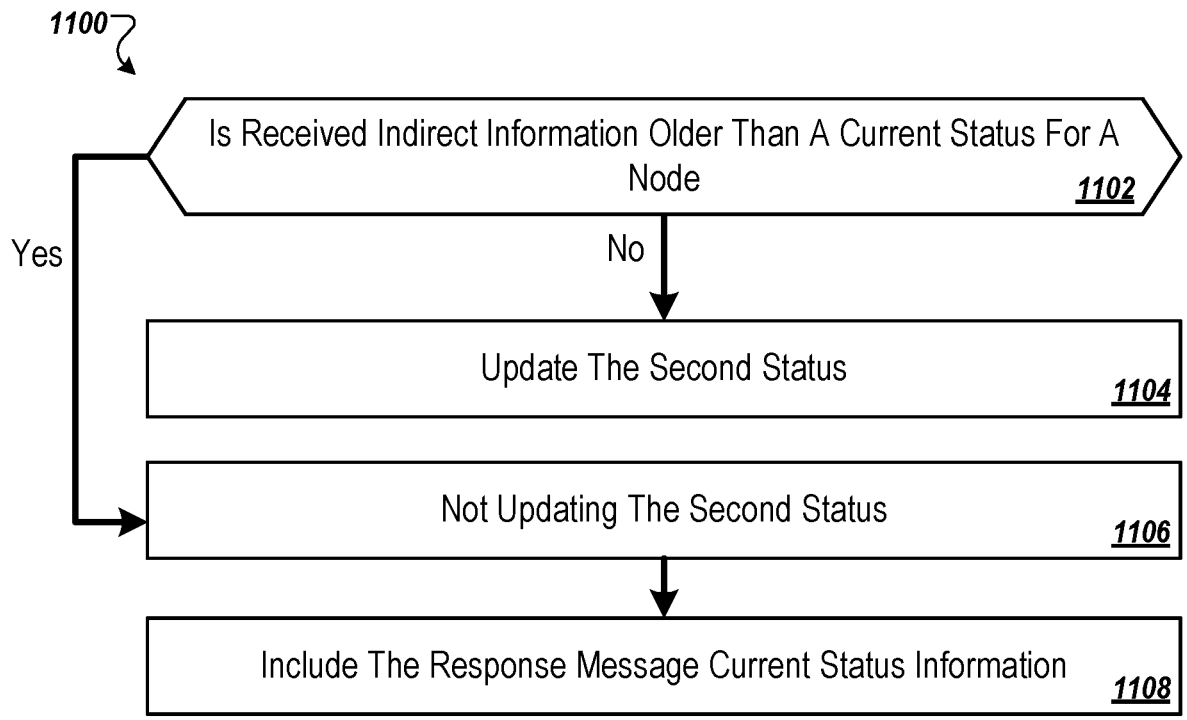
FIG. 11 is a flow chart of an example method of conditionally updating a status of a node in a subnet.

FIG. 11 is a flow chart of an example method 1100 of conditionally updating a status, according to at least one embodiment described in the present disclosure. The method 1100 may be implemented as a part or portion of another method. For instance, the method 1100 may be implemented in block 708 of the method 700.

The method 1100 may begin at block 1102 in which it may be determined whether indirect information of a node is older than current status information of the node. For instance, it may be determined whether indirect information received in a ping message is older than current status information of the node in a status list.

Responsive to the current status information being older than the indirect information ("NO" at block 1102), the method 1100 may proceed to block 1104. At block 1104, the status of the node may be updated in the status list. The status of the node may be updated in the status list consistent with status information (e.g., a machine or election state) in the indirect information.

Responsive to the indirect information being older than the current status information of the status, ("YES" at block 1102), the method 1100 may proceed to block 1106. At block 1106, the status may not be updated with the indirect information. At block 1108, the current status information of the node and the current status information of the third node is included in a response message rather than randomly identifying which information is included in the response message. Inclusion of the current status information in the response message may enable communication of the current status information related to the node instead of the indirect information.

In some embodiments, a determination of whether the indirect information is older than a current status for a node is based on an evaluation of a timestamp of the indirect information relative to an existing timestamp of a status entry for the node. Responsive to the timestamp of the indirect information being greater than the existing timestamp of the status entry for the node by a particular value (e.g., 1, 2, 3 or another suitable value), the indirect information may be accepted, and the first node may overwrite the status entry with the indirect information (e.g., block 1104). Responsive to the timestamp of the indirect information being less than the existing timestamp of the status entry for the node. The first node may not overwrite the status entry with the indirect information and may communicate a priority ping message to the transmitting node during an immediately subsequent swim period. The priority ping message may include information of the status entry related to the node. The transmitting node may then update its status list and begin to communicate more current information (e.g., blocks 1106 and 1108). The particular value may help mitigate differences in timestamps that may result from time zone differences or clock differences between the nodes.

Figure 12:
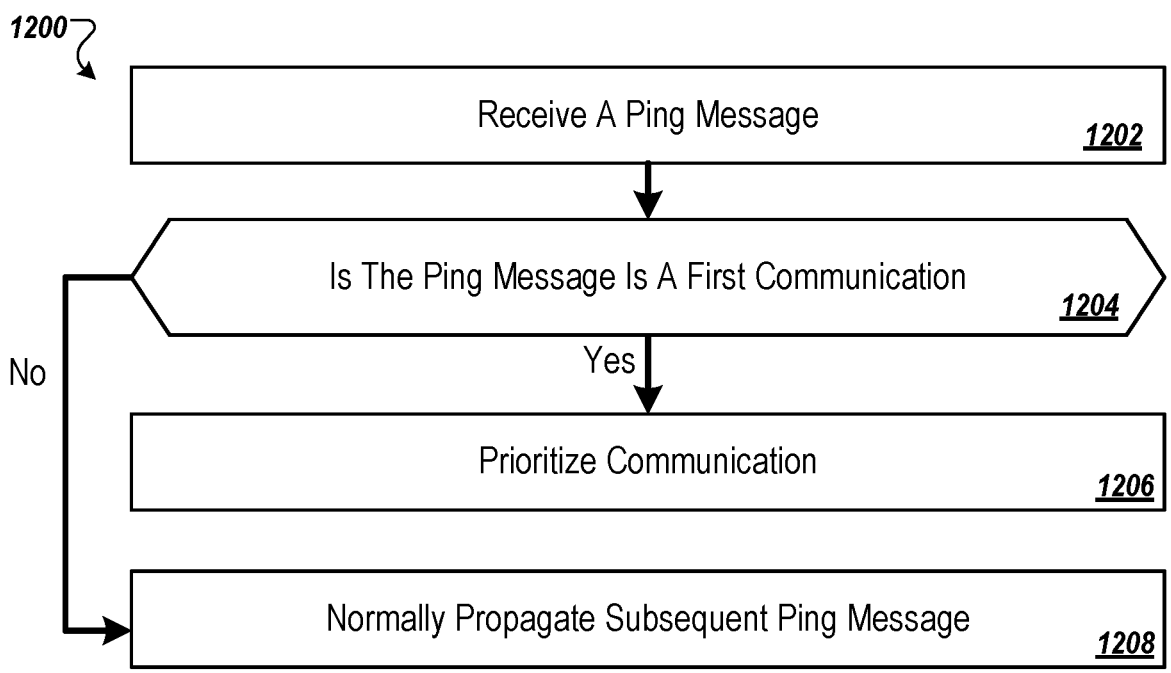
FIG. 12 is a flow chart of example method of modifying an aspect of propagation of a ping message.
Figure 13:
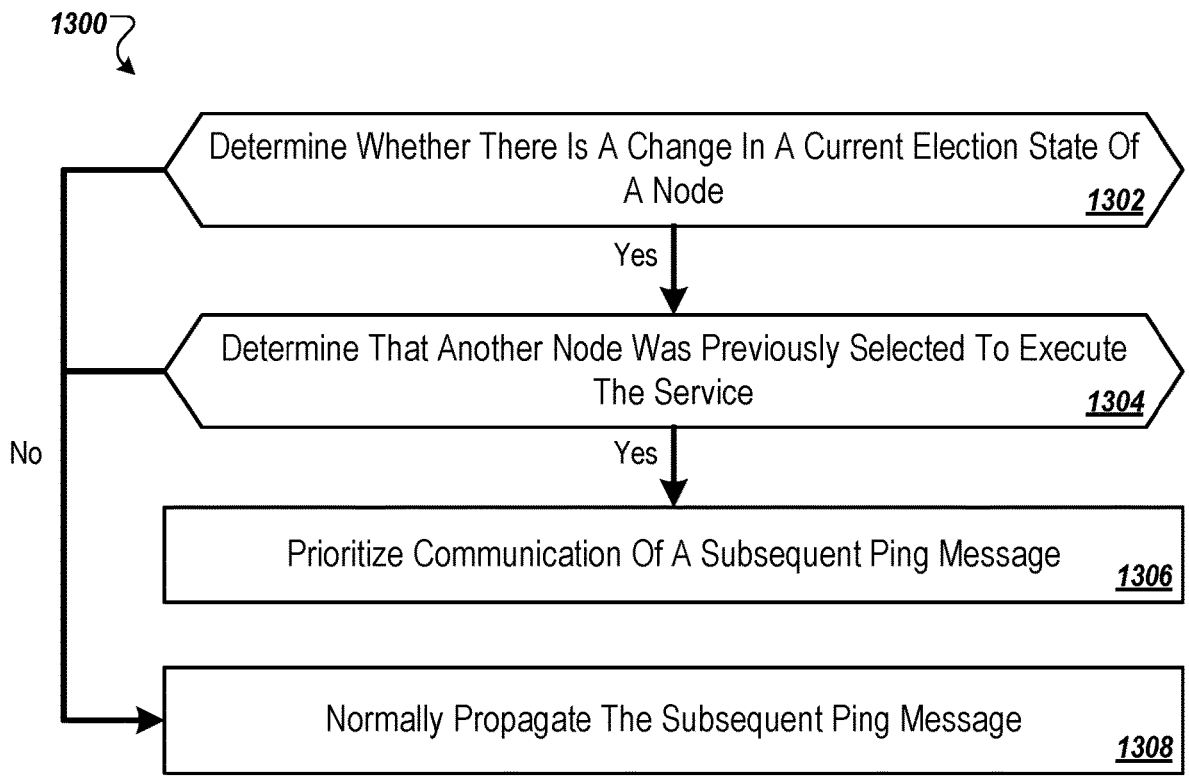
FIG. 13 is a flow chart of another example method of modifying an aspect of propagation of a ping message.
Figure 14:
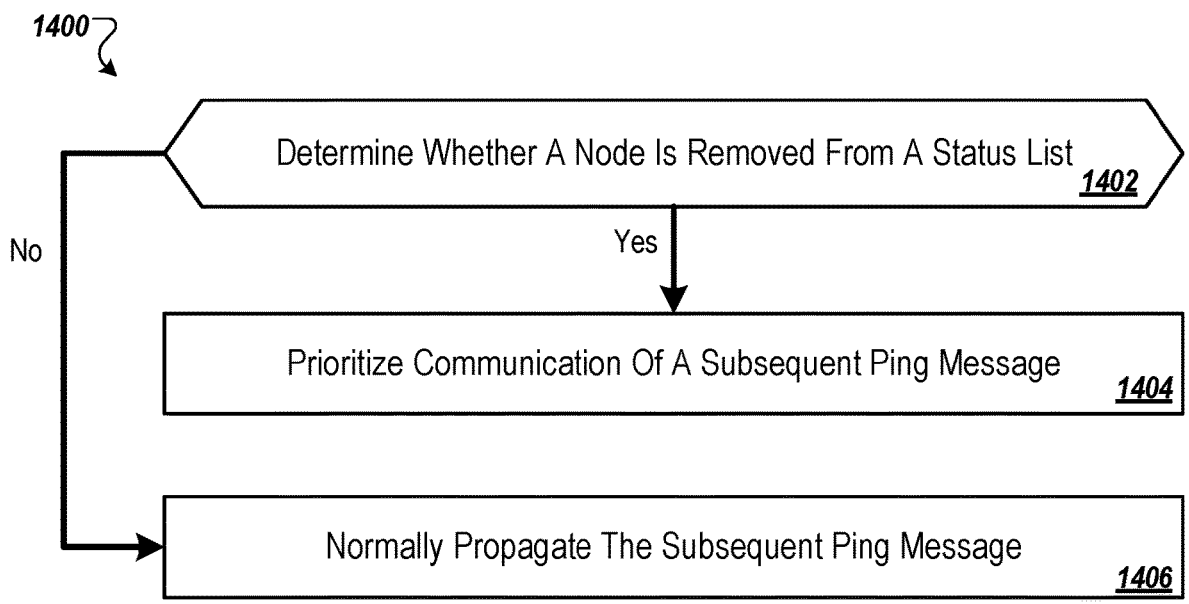
FIG. 14 is a flow chart of yet another example method of modifying an aspect of propagation of a ping message, all according to at least one embodiment described in the present disclosure.

FIGS. 12, 13, and 14 are flow charts of example methods 1200, 1300, and 1400 of modifying an aspect of propagation of a ping message, according to at least one embodiment described in the present disclosure. The methods 1200, 1300, and 1400 may be implemented as a part or portion of another method. For instance, the methods 1200, 1300, and 1400 may be implemented in block 716 of the method 700.

Referring to FIG. 12, the method 1200 may begin at block 1202 in which a ping message may be received. The ping message may be received by a first node and may be received from a second node in a subnet with the first node. In some embodiments, the ping message may be a multicast message or a broadcast message communicated by a new node entering or being reactivated in a subnet. At block 1204, it may be determined whether the ping message is a first communication from the second node received by the first node. Responsive to the ping message being the first communication ("YES" at block 1204), the method 1200 may proceed to block 1206. At block 1206, communication of a second ping message communicated by the first node may be prioritized. The second ping message may be communicated first to the second node before any other node of subnet. The second ping message may include information such as a current election state of the first node. Communication of the second ping message to the second node may ensure the second node does not determine itself to be elected for the service.

Responsive to the ping message not being the first communication ("NO" at block 1204), the method 1200 may proceed to block 1208. At block 1208, subsequent ping messages may be propagated normally. For instance, the subsequent ping messages may be propagated according to the method 900 described above or another suitable propagation process.

Referring to FIG. 13, the method 1300 may begin at block 1302 in which it is determined whether there is a change in a current election state of a node. For example, following performance of a local election operation (e.g., at block 712 of the method 700), the current election state of the node may change from passive (e.g., not executing the service on behalf of the subnet) to selected (e.g., configured to execute the service) or vice versa. Responsive to the change in the current election state of the node ("YES" at block 1302), the method 1300 may proceed to block 1304. Responsive to no change occurring in an election state of the node ("NO" at block 1302), the method 1300 may proceed to block 1308.

At block 1304, it may be determined that another node of the subnet was previously selected to execute the service. In particular, at block 1304 it may be determined that another node was previously selected to execute the service prior to the change in the current state (the change determined in block 1302). Responsive to the other node being previously selected to execute the service ("YES" at block 1304), the method 1300 may proceed to block 1306. Responsive to the other node not being previously selected ("NO" at block 1304), the method 1300 may proceed to block 1308. At block 1306, communication of a subsequent or an outgoing ping message may be prioritized. The communication of an outgoing ping message may be prioritized from the first node to the node that was previously selected above communication of the outgoing ping message to any other node. Prioritization of the outgoing ping message may enable the current election state of the node to be reported to the other node. At block 1308, the subsequent ping messages may be propagated normally. For instance, the subsequent ping messages may be propagated according to the method 900 described above or another suitable propagation process.

Referring to FIG. 14, the method 1400 may begin at block 1402 in which it is determined whether a node is removed from a status list. For example, a first node may receive a ping message with direct or indirect information. The direct and/or the indirect information may relate to a second node of the subnet. The first node may attempt to update the status list with the direct and/or indirect information. In some circumstances, the first node may detect that the second node is removed from the status list. For instance, the first node may have previously received information that the second node is removed from the subnet. Responsive to a determination that the node is removed from the status list ("YES" at block 1402), the method 1400 may proceed to block 1404. Responsive to a determination that the node is present in the status list ("NO" at block 1402), the method 1400 may proceed to block 1406.

At block 1404, communication of an outgoing ping message may be prioritized. The outgoing ping message may include a current election state of the communicating node (e.g., the first node). The communication of the outgoing ping message may be prioritized to the node that is not in the status list above communication of the outgoing ping message to any other node. Prioritization of the communication may ensure the node is not simultaneously elected to execute the service. At block 1406, the outgoing or subsequent ping messages may be propagated normally. For instance, the subsequent ping messages may be propagated according to the method 900 described above or another suitable propagation process.

Similar to the method 700, the methods 800, 900, 1000, 1100, 1200, 1300, 1400 or some combination thereof (collectively, methods 800-1400) may involve or may be based on distribution of information using modified SWIM protocol and local node election operations. The methods 800-1400 may be performed in a suitable operating environment such as the first operating environment 100 or the second operating environment 200 of FIGS. 1 and 2, respectively. The methods 800-1400 may be performed by one or more of the nodes 106 described elsewhere in the present disclosure or by another suitable computing system, such as the computing system 600 of FIG. 6. The node implementing the methods 800-1400 may be included in a cloud-based networked system, an on-premises system, a managed network, managed subnetwork, or another suitable network computing environment.

Although illustrated as discrete blocks, one or more blocks in FIGS. 7A-14 may be divided into additional blocks, combined into fewer blocks, or eliminated, depending on the desired implementation. One or more of the methods described in the present disclosure (e.g., 700, 800, 900, 1000, 1100, 1200, 1300, or 1400) may be performed in a suitable operating environment such as one or both of the operating environments 100 or 200. One or more of the methods may be performed by the nodes 106, the election module 144, or some combination thereof. In some embodiments, the node 106 or another computing system may include or may be communicatively coupled to a non-transitory computer-readable medium (e.g., the memory 612 of FIG. 6) having stored thereon programming code or instructions that are executable by one or more processors (such as the processor 610 of FIG. 6) to cause a computing system or the node 106 to perform or control performance of the methods. Additionally or alternatively, the node 106 may include the processor 610 described elsewhere in this disclosure that is configured to execute computer instructions to cause the node 106 or another computing systems to perform or control performance of the methods.

Further, modifications, additions, or omissions may be made to the methods without departing from the scope of the present disclosure. For example, the operations of methods may be implemented in differing order. Furthermore, the outlined operations and actions are only provided as examples, and some of the operations and actions may be optional, combined into fewer operations and actions, or expanded into additional operations and actions without detracting from the disclosed embodiments.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

The various features illustrated in the drawings may not be drawn to scale. The illustrations presented in the present disclosure are not meant to be actual views of any particular apparatus (e.g., device, system, etc.) or method, but are representations employed to describe embodiments of the disclosure. Accordingly, the dimensions of the features may be expanded or reduced for clarity. In addition, some of the drawings may be simplified for clarity. Thus, the drawings may not depict all of the components of a given apparatus (e.g., device) or all operations of a particular method.

Terms used in the present disclosure and the claims (e.g., bodies of the appended claims) are intended as "open" terms (e.g., the term "including" should be interpreted as "including, but not limited to," the term "having" should be interpreted as "having at least," the term "includes" should be interpreted as "includes, but is not limited to," among others). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in instances in which a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase presenting two or more alternative terms should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

The terms "first," "second," "third," etc., are not necessarily used to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the scope of the invention.

What is claimed is:

1. A method of self-election of a node in a subnet, the method comprising:
receiving, by a first node of a plurality of nodes in a subnet, a first ping message, the first ping message being unicast from a second node of the plurality of nodes in the subnet, wherein: the first ping message includes direct information including a first election state and a first machine state of the second node and indirect information including a second election state and a second machine state of a third node of the plurality of nodes in the subnet, and wherein the direct information and the indirect information are weighted differently;
updating a first status of the second node in a status list stored at the first node consistent with the direct information;
determining whether statuses have been received from a threshold number of nodes of the plurality of nodes in the status list;
responsive to the threshold number of nodes being received, performing a local election operation, wherein the local election operation includes:
determining a current election score of the first node based on election rules associated with identifying a particular node from the plurality of nodes in the subnet to provide a service;
comparing the current election score to determined election scores of the threshold number of nodes; and
responsive to the current election score being greater than the determined election scores:
changing a current election state of the first node to a selected state for the service;
communicating a response message to the second node, wherein the response message includes the current election state of the first node and indirect information related to one or more nodes of the plurality of nodes, and the response message is configured to indicate that the first node is an elected node for exclusive execution of the service in the subnet; and
executing, by the first node, the service in the subnet without oversight by an administration device;
propagating a second ping message to at least one randomly identified additional node of the plurality of nodes, the second ping message including direct information regarding the first node and indirect information regarding at least one other node of the plurality of nodes, wherein the propagating includes:
at each Scalable, Weakly-Consistent, Infection-Style, Processes Group Membership Protocol (SWIM) period of a plurality of SWIM periods:
randomly identifying one or more receiving nodes from a receiving node pool;
randomly identifying one or more ancillary nodes from an ancillary node pool;
generating a ping message for a current SWIM period that includes indirect information related to the identified ancillary nodes and direct information of the first node;
communicating the ping message to each of the identified receiving nodes;
removing the identified ancillary nodes from the ancillary node pool; and
removing the identified receiving nodes from the receiving node pool; and
following communication of one of the ping messages to each of the plurality of nodes following communication of one of the ping messages to each of the plurality of nodes during the current SWIM period, the receiving node pool and the ancillary node pool are repopulated with all of the plurality of nodes except the first node.

2. The method of claim 1, further comprising:
communicating a multicast ping message to a subset of nodes of the plurality of nodes in the subnet;
responsive to failure to receive a response message to the multicast ping message, communicating a broadcast ping message to the plurality of nodes in the subnet;
responsive to failure to receive a response message to the broadcast ping message, listening for an address resolution protocol (ARP) message; and
responsive to failure to receive a response based on the ARP listening, determining that the first node is an initial node of the subnet.

3. The method of claim 1, wherein
a number of SWIM periods in the plurality of SWIM periods is related to a number of nodes in the plurality of nodes.

4. The method of claim 3, further comprising:
determining whether the received indirect information regarding the third node is new to the status list; and
responsive to the received indirect information being new to the status list, setting a number of the one or more receiving nodes identified during each SWIM period to include at least three receiving nodes.

5. The method of claim 1, further comprising responsive to the threshold number of nodes not being received, continuing to receive ping messages, and updating the status list.

6. The method of claim 1, further comprising:
determining whether the third node is removed from the status list; and
responsive to a determination that the third node is removed from the status list, prioritizing communication of a third ping message including the current election state from the first node to the third node above communication of the third ping message to any other node of the plurality of nodes to ensure the third node is not simultaneously elected to execute the service.

7. The method of claim 1, further comprising responsive to either a third ping message from a fifth node being a first communication received at the first node from the fifth node; or a change in the current election state of the first node and a fifth node of the plurality of nodes was previously selected to execute the service in the subnet prior to the change in the current election state, prioritizing communication of a third ping message from the first node to the fifth node above communication of the third ping message to any other node of the plurality of nodes.

8. The method of claim 1, further comprising:
determining whether the indirect information received in the first ping message is older than current status information of a second status of the third node in the status list;
responsive to the indirect information being older than the current status information of the second status, not updating the second status with the indirect information and including in the response message, the current status information of the third node such that the second node is able to communicate the current status information instead of the indirect information; and
responsive to the current status information of the second status being older than the indirect information, updating the second status of the third node in the status list consistent with status information in the indirect information.

9. The method of claim 1, wherein:
the first ping message is one of multiple ping messages received by the first node;
each ping message of the multiple ping messages includes a node number that indicates a number of nodes the transmitting node has identified in the subnet; and
the determining whether statuses of a threshold number of nodes are updated includes averaging the number of nodes reported in the node numbers of the multiple ping messages and applying a threshold number to an averaged number of nodes.

10. The method of claim 1, further comprising responsive to the current election score being greater than the determined election scores:
creating a new time stamp for the current election state; and
appending the new time stamp to information representative of the current election state,
wherein:
the new time stamp is a monotonic increase of a previous time stamp attached to a previous election state of the first node; and
the response message includes the new time stamp with the current election state.

11. A non-transitory computer-readable medium having encoded therein programming code executable by one or more processors to perform or control performance of operations of self-election of a node in a subnet, the operations comprising:
receiving, by a first node of a plurality of nodes in a subnet, a first ping message, the first ping message being unicast from a second node of the plurality of nodes in the subnet, wherein: the first ping message includes direct information including a first election state and a first machine state of the second node and indirect information including a second election state and a second machine state of a third node of the plurality of nodes in the subnet, and wherein the direct information and the indirect information are weighted differently;
updating a first status of the second node in a status list stored at the first node consistent with the direct information;
determining whether statuses have been received from a threshold number of nodes of the plurality of nodes in the status list;
responsive to the threshold number of nodes being received, performing a local election operation, wherein the local election operation includes:
determining a current election score of the first node based on election rules associated with identifying a particular node from the plurality of nodes in the subnet to provide a service;
comparing the current election score to determined election scores of the threshold number of nodes; and
responsive to the current election score being greater than the determined election scores:
changing a current election state of the first node to a selected state for the service;
communicating a response message to the second node, wherein the response message includes the current election state of the first node and indirect information related to one or more nodes of the plurality of nodes, and the response message is configured to indicate that the first node is an elected node for exclusive execution of the service in the subnet; and
executing, by the first node, the service in the subnet without oversight by an administration device; and
propagating a second ping message to at least one randomly identified additional node of the plurality of nodes, the second ping message including direct information regarding the first node and indirect information regarding at least one other node of the plurality of nodes wherein the propagating includes:
at each Scalable, Weakly-Consistent, Infection-Style, Processes Group Membership Protocol (SWIM) period of a plurality of SWIM periods:
randomly identifying one or more receiving nodes from a receiving node pool;
randomly identifying one or more ancillary nodes from an ancillary node pool;
generating a ping message for a current SWIM period that includes indirect information related to the identified ancillary nodes and direct information of the first node;
communicating the ping message to each of the identified receiving nodes;
removing the identified ancillary nodes from the ancillary node pool; and
removing the identified receiving nodes from the receiving node pool; and
following communication of one of the ping messages to each of the plurality of nodes during the current SWIM period, the receiving node pool and the ancillary node pool are repopulated with all of the plurality of nodes except the first node.

12. The non-transitory computer-readable medium of claim 11, wherein the operations further comprise:
communicating a multicast ping message to a subset of nodes of the plurality of nodes in the subnet;
responsive to failure to receive a response message to the multicast ping message, communicating a broadcast ping message to the plurality of nodes in the subnet;
responsive to failure to receive a response message to the broadcast ping message, listening for an address resolution protocol (ARP) message; and
responsive to failure to receive a response based on the ARP listening, determining that the first node is an initial node of the subnet.

13. The non-transitory computer-readable medium of claim 11, wherein
a number of SWIM periods in the plurality of SWIM periods is related to a number of nodes in the plurality of nodes.

14. The non-transitory computer-readable medium of claim 13, wherein the operations further comprise:
determining whether the received indirect information regarding the third node is new to the status list; and
responsive to the received indirect information being new to the status list, setting a number of the one or more receiving nodes identified during each SWIM period to include at least three receiving nodes.

15. The non-transitory computer-readable medium of claim 11, wherein the operations further comprise responsive to the threshold number of nodes not being received, continuing to receive ping messages, and updating the status list.

16. The non-transitory computer-readable medium of claim 11, wherein the operations further comprise:
  determining whether the third node is removed from the status list; and
  responsive to a determination that the third node is removed from the status list, prioritizing communication of a third ping message including the current election state from the first node to the third node above communication of the third ping message to any other node of the plurality of nodes to ensure the third node is not simultaneously elected to execute the service.

17. The non-transitory computer-readable medium of claim 11, wherein the operations further comprise prioritizing communication of a third ping message from the first node to a fifth node above communication of the third ping message to any other node of the plurality of nodes responsive to either:
  a third ping message from the fifth node being a first communication received at the first node from the fifth node; or
  a change in the current election state of the first node and the fifth node of the plurality of nodes was previously selected to execute the service in the subnet prior to the change in the current election state.

18. The non-transitory computer-readable medium of claim 11, wherein the operations further comprise:
  determining whether the indirect information received in the first ping message is older than current status information of a second status of the third node in the status list;
  responsive to the indirect information being older than the current status information of the second status, not updating the second status with the indirect information and including in the response message, the current status information of the third node such that the second node is able to communicate the current status information instead of the indirect information; and
  responsive to the current status information of the second status being older than the indirect information, updating the second status of the third node in the status list consistent with status information in the indirect information.

19. The non-transitory computer-readable medium of claim 11, wherein:
  the first ping message is one of multiple ping messages received by the first node;
  each ping message of the multiple ping messages includes a node number that indicates a number of nodes the transmitting node has identified in the subnet; and
  the determining whether statuses of a threshold number of nodes are updated includes averaging the number of nodes reported in the node numbers of the multiple ping messages and applying a threshold number to an averaged number of nodes.

20. The non-transitory computer-readable medium of claim 11, wherein:
  the operations further comprise responsive to the current election score being greater than the determined election scores:
    creating a new time stamp for the current election state; and
    appending the new time stamp to information representative of the current election state, and
  the new time stamp is a monotonic increase of a previous time stamp attached to a previous election state of the first node; and
  the response message includes the new time stamp with the current election state.

* * * * *